United States Patent
Treat et al.

(10) Patent No.: US 11,387,981 B2
(45) Date of Patent: Jul. 12, 2022

(54) PLATFORM FOR MULTI-PARTY DIGITAL RECORDS USING DISTRIBUTED LEDGER SYSTEM

(71) Applicant: Accenture Global Solutions Limited, Dublin (IE)

(72) Inventors: David Treat, Ridgefield, CT (US); Shane R. Marshall, Valparaiso, IN (US)

(73) Assignee: Accenture Global Solutions Limited, Dublin (IE)

( * ) Notice: Subject to any disclaimer, the term of this patent is extended or adjusted under 35 U.S.C. 154(b) by 253 days.

(21) Appl. No.: 16/274,355

(22) Filed: Feb. 13, 2019

(65) Prior Publication Data

US 2019/0253240 A1     Aug. 15, 2019

Related U.S. Application Data

(60) Provisional application No. 62/630,011, filed on Feb. 13, 2018.

(51) Int. Cl.
*H04L 9/06* (2006.01)
*H04L 9/32* (2006.01)
*H04L 9/00* (2022.01)

(52) U.S. Cl.
CPC .......... *H04L 9/0643* (2013.01); *H04L 9/0637* (2013.01); *H04L 9/3239* (2013.01); *H04L 9/3247* (2013.01); *H04L 9/3297* (2013.01); *H04L 9/50* (2022.05)

(58) Field of Classification Search
CPC ... H04L 9/0643; H04L 9/0637; H04L 9/3239; H04L 9/3247; H04L 2209/38; H04L 9/3297; H04L 9/50
See application file for complete search history.

(56) References Cited

U.S. PATENT DOCUMENTS

| | | | |
|---|---|---|---|
| 9,774,578 B1* | 9/2017 | Ateniese | H04L 9/3242 |
| 9,830,345 B1* | 11/2017 | Baars | G06F 16/137 |
| 10,135,609 B2* | 11/2018 | Bibera | H04L 9/30 |
| 10,261,711 B1* | 4/2019 | Pasirstein | H04L 9/3239 |
| 10,404,469 B2* | 9/2019 | Madhavan | H04L 63/123 |
| 10,521,775 B2* | 12/2019 | Hearn | G06Q 20/3827 |
| 10,616,324 B1* | 4/2020 | Kaddoura | H04L 43/04 |

(Continued)

*Primary Examiner* — Catherine Thiaw
(74) *Attorney, Agent, or Firm* — Fish & Richardson P.C.

(57) ABSTRACT

Implementations include actions of providing a first transaction hash including a digital representation of a digital record between a first peer and a second peer within a digital records platform, the platform provided by the first peer as a host peer, and the transaction hash being generated based on one or more documents underlying the digital record, receiving one or more edits to at least one document from the second peer, updating the first transaction hash to provide: a second transaction hash, and a transaction hash history including the first transaction hash and the second transaction hash, receiving approval of the digital record from each of the first peer and the second peer, and executing a consensus protocol by a notary service of a third node to update transaction objects across the first node and the second node, the updating indicating that the transaction objects are consistent.

36 Claims, 19 Drawing Sheets

(56) References Cited

U.S. PATENT DOCUMENTS

| | | | |
|---|---|---|---|
| 2004/0054906 A1* | 3/2004 | Carro | G06F 21/64 |
| | | | 713/171 |
| 2005/0198511 A1* | 9/2005 | Tomkow | H04L 63/123 |
| | | | 713/176 |
| 2005/0251682 A1* | 11/2005 | Collins | G06F 21/64 |
| | | | 713/176 |
| 2008/0028224 A1* | 1/2008 | Pitsos | H04L 9/3247 |
| | | | 713/178 |
| 2017/0301047 A1* | 10/2017 | Brown | G06Q 20/382 |
| 2017/0364450 A1* | 12/2017 | Struttmann | G06F 12/1408 |
| 2017/0366516 A1* | 12/2017 | Pattanaik | H04L 63/0428 |
| 2018/0082296 A1* | 3/2018 | Brashers | G06Q 20/405 |
| 2018/0173719 A1* | 6/2018 | Bastide | G06F 16/13 |
| 2018/0309567 A1* | 10/2018 | Wooden | H04L 9/3239 |
| 2019/0058709 A1* | 2/2019 | Kempf | H04L 9/3226 |
| 2019/0081796 A1* | 3/2019 | Chow | H04L 9/30 |
| 2019/0103973 A1* | 4/2019 | Chalkias | H04L 9/0618 |
| 2019/0156336 A1* | 5/2019 | Kasthuri | H04L 9/3236 |
| 2019/0171849 A1* | 6/2019 | Assenmacher | G06F 21/64 |
| 2019/0205558 A1* | 7/2019 | Gonzales, Jr. | G06F 16/1805 |
| 2019/0305937 A1* | 10/2019 | Baykaner | H04L 9/3236 |
| 2020/0211005 A1* | 7/2020 | Bodorik | G06Q 10/00 |
| 2021/0279723 A1* | 9/2021 | Magerkurth | G06Q 20/3829 |

* cited by examiner

FIG. 7C

Contract Details | Contract History Details | Transaction Hash Code History

Contract Title ACN TC Contract

Contract Type Master Services Agreement

Contract Status ⊗ Pending Approval

Sender Name CompanyB

Recipient Name Accenture

Sender Legal Entity CompanyB Legal Entity 1

Recipient Legal Entity Accenture Legal Entity 1

Effective Date 01/01/2018

Expiration Date 08/01/2019

Contract Documents

- Accenture_Company B Agreement.docx
- Company B Limitations.docx
- Accenture Supporting Documents.docx All fields marked with an asterisk "*" are mandatory

| Contract History Details | |
|---|---|
| 2018-01-11 12:37:36 | Contract Title: ACN TC Contract |
| 2018-01-11 11:51:57 | Contract Type: Master Services Agreement |
| ⊘ Rejected | Sender Name: Company8 |
| ⋈ Pending Approval | Sender Legal Entity: Company8 Legal Entity 1 |
| | Recipient Name: Accenture |
| | Recipient Legal Entity: Accenture Legal Entity 1 |
| | Effective Date: 01/01/2018 |
| | Expiration Date: 08/01/2019 |
| | Contract Documents: Accenture_Company B Agreement.docx; Company B Limitations.docx; Accenture Supporting Documents.docx |

FIG. 7G

PLATFORM FOR MULTI-PARTY DIGITAL RECORDS USING DISTRIBUTED LEDGER SYSTEM

CROSS-REFERENCE TO RELATED APPLICATIONS

This application claims priority to U.S. Prov. App. No. 62/630,011, filed on Feb. 13, 2018, the disclosure of which is expressly incorporated herein by reference in the entirety.

BACKGROUND

Enterprises interact at various levels in cooperative efforts. For example, enterprises can engage each other, and the engagement can be defined within one or more digital records. Management of digital records is a manual, resource-intensive task, and can be insecure.

SUMMARY

Implementations of the present disclosure are generally directed to a digital records management platform. More specifically, implementations are directed to a digital record management platform using a distributed ledger system (DLS).

In some implementations, actions include providing a first transaction hash code including a digital representation of a digital record between a first peer and a second peer within a digital records platform, the digital records platform provided by the first peer as a host peer, and the transaction hash code being generated based on one or more documents underlying the digital record, receiving one or more edits to at least one document from the second peer, updating the first transaction hash code to provide: a second transaction hash code, and a transaction hash history including the first transaction hash code and the second transaction hash code, receiving approval of the digital record from each of the first peer and the second peer, and executing a consensus protocol by a notary service of a third node to update transaction objects across the first node and the second node, the updating indicating that the transaction objects are consistent, and the executing a consensus protocol performed in response to the receiving the approval of the digital record. Other implementations of this aspect include corresponding systems, apparatus, and computer programs, configured to perform the actions of the methods, encoded on computer storage devices.

These and other implementations can each optionally include one or more of the following features: the transaction hash code is generated based on a plurality of hash codes including a documents hash code and an attachments hash code; the documents hash code is generated based on hash codes of respective documents underlying the digital record; the one or more edits include at least one edit to a section of a document the second hash code being generated based on the at least one edit; consistent transaction objects across the first peer and the second peer each include a digital signature of the first peer, a digital signature of the second peer, and a digital signature of the notary service; each transaction object includes an input state and an output state, the output state of a first transaction object being the input state of a second transaction object; the notary service executes a consensus protocol to achieve consistency between transaction objects across the first node and the second node; the digital records platform includes a permissioned distributed ledger system; the digital record is stored in a blockchain; the digital record is provided from a library of digital records maintained within the digital record platform; each of the first node and the second node are operated by respective enterprises that interact with the digital records platform; and the digital record represents a contract.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIGS. 7A-7G depict example user interfaces in accordance with implementations of the present disclosure.

Like reference numbers and designations in the various drawings indicate like elements.

DETAILED DESCRIPTION

Figure 1:
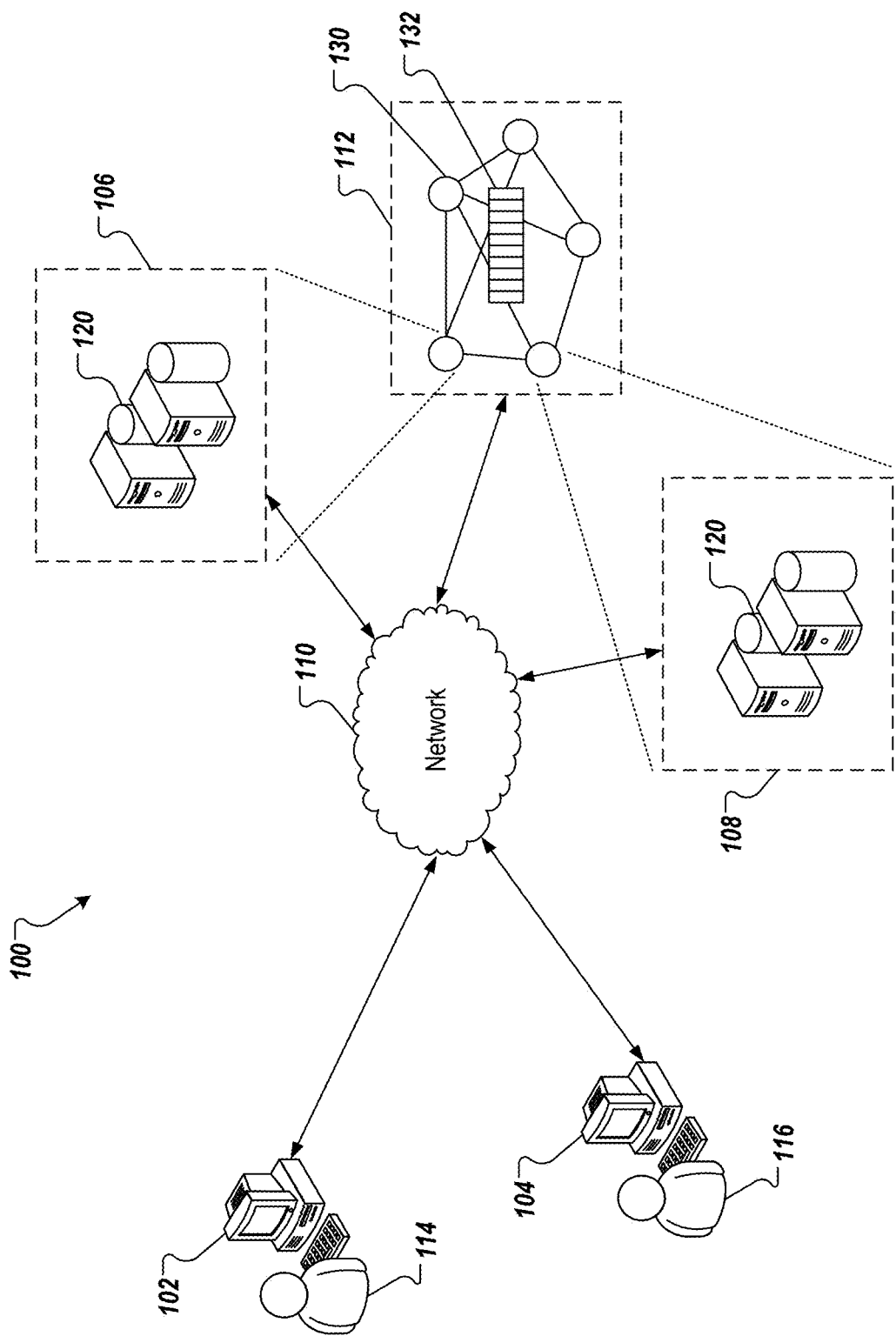
FIG. 1 depicts an example environment that can be used to execute implementations of the present disclosure.

Implementations of the present disclosure are generally directed to a digital record management platform. More specifically, implementations are directed to a digital record management platform using a distributed ledger system (DLS). In some implementations, actions include providing a first transaction hash code including a digital representation of a digital record between a first peer and a second peer within a digital records platform, the digital records platform provided by the first peer as a host peer, and the transaction hash code being generated based on one or more documents underlying the digital record, receiving one or more edits to at least one document from the second peer, updating the first transaction hash code to provide: a second transaction hash code, and a transaction hash history including the first transaction hash code and the second transaction hash code, receiving approval of the digital record from each of the first peer and the second peer, and executing a consensus protocol by a notary service of a third node to update transaction objects across the first node and the second node, the updating indicating that the transaction objects are consistent, and the executing a consensus protocol performed in response to the receiving the approval of the digital record.

As introduced above, implementations of the present disclosure provide a digital record management platform using a DLS, also referred to herein as a blockchain network. Implementations of the present disclosure are described with reference to an example blockchain network, which includes a consortium blockchain network. Further, implementations of the present disclosure are described in further detail with reference to an example context. The example context includes digital records representing an agreement, or contract between multiple parties. For example, digital records can include a set of digital records embodying a contract between the multiple parties. In view of the example context, the digital records management platform of the present disclosure can be referred to as the Blockchain for Contracts (B4C) platform. It is contemplated, however, that implementations of the present disclosure can be realized with any appropriate, computer-implemented blockchain network. Further, it is contemplated that implementations of the present disclosure can be realized with multiple-party contracts, or any appropriate context.

In accordance with implementations of the present disclosure, and as described in further detail herein, the B4C platform enables contract management between enterprises. In some implementations, the B4C platform enables a contract to be proposed, revised, and executed. In some examples, each enterprise that is a party to a contract hosts one or more nodes in the blockchain network. In this manner, a private, secure connection is established between the enterprises using the blockchain network. In some implementations, each enterprise accesses the B4C platform through respective front-ends. In some examples, a front-end includes one or more graphical user interfaces (GUIs), through which agents of an enterprise (e.g., employees of the enterprise) interact with the blockchain network, and other enterprises.

In accordance with implementations of the present disclosure, the blockchain network provides a single source of truth for each contract. In this manner, parties to a contract can be assured that each is working from the same version of the contract within the B4C platform. Further, the B4C platform leverages encryption, and data restriction to provide enhanced security, while providing transparency to the parties to the contract. The parties can interact with a live version of the contract, and each transaction is immutably recorded within a blockchain maintained by the blockchain network, creating an immutable audit trail. In some examples, and as described in further detail herein, immutability is provided by capturing and recording unique hash values corresponding to transactions, and/or documents on the blockchain network. For example, a hash code is unique to a contract, and can be used to identify one contract from another within the B4C platform. In some examples, each version of a contract has a unique hash code.

To provide further context for implementations of the present disclosure, a DLS is a decentralized system that is referred to herein as a consensus network, or a blockchain network, and that maintains a distributed ledger, referred to herein as a blockchain. A blockchain network is made up of peer-to-peer nodes, and enables participating entities to securely, and immutably conduct transactions, and store data. Although the term blockchain is generally associated with crypto-currency networks, blockchain is used herein to generally refer to a distributed ledger without reference to any particular use case.

A blockchain is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). The transaction data is immutably stored within the blockchain. That is, the transaction data cannot be changed.

Accordingly, a blockchain is a data structure that stores data in a way that the data is immutable and can be verified. Each block in the chain is linked to a previous block immediately before it in the chain by including a cryptographic hash of the previous block. Each block also includes a timestamp, its own cryptographic hash, and data. Each block is provided based on one or more transactions. In the context of the instant application, a transaction can include a change to an electronic document (e.g., a contract). Example changes can include, without limitation, creating a document, editing a document, deleting a document.

The transactions, which have been verified by nodes of the blockchain network are hashed and encoded into a hash tree, which can include, for example, a Merkle tree, or a Merkle-Patricia tree (MPT). More particularly, before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

A hash tree is a data structure in which data at the leaf nodes of the tree is hashed, and all hashes in each branch of the tree are concatenated at the root of the branch. This process continues up the tree to the root of the entire tree, which stores a hash that is representative of all data in the tree. This hash value is referred to as a root hash (Merkle root hash) and is stored in a header of the block. A change in any of the transactions will result in change in its hash value, and ultimately, a change in the Merkle root hash. A hash purporting to be of a transaction stored in the tree can be quickly verified by determining whether it is consistent with the structure of the hash tree.

Whereas a blockchain is a data structure for storing transactions, a blockchain network is a network of computing nodes that manage, update, and maintain one or more blockchains. A blockchain network can be provided as a public blockchain network, a private blockchain network, or a consortium blockchain network. Implementations of the present disclosure are described in further detail herein with reference to a consortium blockchain network, which is private among the participating entities. It is contemplated, however, that implementations of the present disclosure can be realized in any appropriate type of blockchain network.

In a consortium blockchain network, the consensus protocol is controlled by an authorized set of nodes, one or more nodes being operated by a respective entity (e.g., the enterprise providing the B4C platform, one or more second parties that interact with the enterprise). For example, a consortium of ten (10) entities can operate within a consortium blockchain network, each of which operates at least one node in the consortium blockchain network. Blocks are added to the blockchain through the consensus protocol. Multiple nodes within the blockchain network participate in the consensus protocol and perform work to have a block added to the blockchain. Such nodes are referred to as consensus nodes.

In some examples, cryptography is implemented to maintain privacy of transactions. For example, if two nodes want to keep a transaction private, such that other nodes cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses key pairs that each include a private key, and a public key, the private key being known only to a respective node, and the public key being known to any or all other nodes in the blockchain network. A node can use the public key of another node to encrypt data, and the encrypted data can be decrypted using other node's private key. For example, Participant A can use Participant B's public key to encrypt data and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, Participant A can digitally sign a message, and another node, Participant B, for example, can confirm that the message was sent by the node based on the digital signature of Participant A. Digital signatures can also be used to ensure that messages are not tampered with in transit. For example, Participant A is to send a message to Participant B. Participant A generates a hash of the message, and, using its private key, encrypts the hash to provide a digital signature as the encrypted hash. Participant A appends the digital signature to the message and sends the message with digital signature to Participant B. Participant B decrypts the digital signature using the public key of Participant A and extracts the hash. Participant B hashes the message and compares the hashes. If the hashes are same, Participant B can confirm that the message was indeed from Participant A and was not tampered with.

FIG. 1 depicts an example environment 100 that can be used to execute implementations of the present disclosure. In some examples, the example environment 100 enables users associated with respective enterprises (e.g., employees) to manage (e.g., create, execute, close) contracts between enterprises in a B4C platform. The example environment 100 includes computing devices 102, 104, back-end systems 106, 108, a network 110, and a blockchain network 112 (e.g., consortium blockchain network). In some examples, the computing devices 102, 104 are used by respective users 114, 116 to log into and interact with the B4C platform of the present disclosure.

In the depicted example, the computing devices 102, 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106, 108). In some examples, the network 110 can be accessed over a wired and/or a wireless communications link. For example, mobile computing devices, such as smartphones can utilize a cellular network to access the network 110.

In the depicted example, the back-end systems 106, 108 each include at least one server system 120. In some examples, the at least one server system 120 hosts one or more computer-implemented services that users can interact with using computing devices. For example, components of the B4C platform can be hosted on one or more of the back-end systems 106, 108. In some examples, a back-end system can be provided as an on-premise system that is operated by an enterprise taking part in the B4C platform. In some examples, a back-end system can be provided as an off-premise system (e.g., cloud) that is operated by a third-party on behalf of an enterprise taking part in the B4C platform.

In some examples, the computing devices 102, 104 each include a computer-executable applications executed thereon, which can be used to log into the B4C platform. In some examples, the computing devices 102, 104 each include a web browser application executed thereon, which can be used to display one or more web pages of the B4C platform. In some examples, each of the computing devices 102, 104 can display one or more GUIs that enable the respective users 114, 116 to interact with the B4C platform.

In accordance with implementations of the present disclosure, the B4C platform leverages the blockchain network 112 to facilitate contract management, and to immutably record contracts, documents, and/or transactions between enterprises. In some implementations, the blockchain network 112 is provided by a third-party provider. In some examples, the blockchain network 112 is one of a permissionless blockchain network, and a permissioned blockchain network. In general, in a permissionless blockchain network, the identity of participants can be obfuscated (e.g., pseudonymous, anonymous), and anyone can participate, read all transactions, participate in the process of block verification to create consensus (described in further detail herein), and the like. In general, in a permissioned blockchain network, all participants are known, approved, and governed.

Implementations of the present disclosure are described in further detail with reference to a permissioned blockchain network. An example permissioned blockchain network includes Corda provided by R3 Ltd. of the United Kingdom. In general, Corda can be described as a distributed ledger (blockchain) platform that can be used to record, manage and synchronize financial agreements between regulated financial institutions. It is contemplated, however, that implementations of the present disclosure can be realized with any appropriate distributed ledger platform.

To provide further context for the present disclosure, a high-level discussion of blockchain (distributed ledger) technology is provided. In general, and as introduced above, a blockchain is a ledger of all transactions that have ever been executed in one or more contexts (e.g., a contract between multiple parties). A blockchain constantly grows as completed blocks are added with a new set of transactions. In some examples, a single block is provided from one or more transactions. In general, blocks are added to the blockchain in a linear, chronological order by one or more computing devices in a peer-to-peer network of interconnected computing devices that execute a consensus protocol. In short, the peer-to-peer network can be described as a plurality of interconnected nodes, each node being a computing device that uses a client to validate and relay transactions (e.g., resource transfers). Each node maintains a copy of the blockchain, which is automatically downloaded to the node upon joining the peer-to-peer network. A consensus protocol provides a secure and reliable method of updating the blockchain, copies of which are distributed across the peer-to-peer network, without the need for a central authority.

Because all users (e.g., participants in an agreement) need to know all previous transactions (e.g., contract creation, edits, signature) to validate a requested transaction, at least a portion of the users (e.g., all users, a majority of users) must agree on which transactions have actually occurred, and in which order. That is, consensus must be reached. For example, if two users observe different transaction histories, they will be unable to come to the same conclusion regarding the validity of a transaction. In some examples, all users agree on the same rules used to validate transactions (e.g., as provided in the blockchain protocol), thus coming to a consensus. In some examples, a consensus protocol enables all users to come to an agreement as to transactions that have already occurred, and in which order.

Nodes can have varying degrees of participation within the blockchain network. For example, some nodes can participate in the consensus process (e.g., as consensus nodes that add blocks to the blockchain), while other nodes do not participate in the consensus process. As another example, some nodes store a complete copy of the blockchain, while other nodes only store copies of portions of the blockchain. For example, data access privileges can limit the blockchain data that a respective participant stores within its respective system.

With continued reference to FIG. 1, the blockchain network 112 is provided as a peer-to-peer network including a plurality of nodes 130, at least some of which immutably record information in a blockchain 132 (distributed ledger). Although a single blockchain 132 is schematically depicted, multiple copies of the blockchain 132 are provided and maintained across the blockchain network 112. For example, multiple nodes 130 each store a copy of the blockchain 132. In some implementations, the blockchain 132 stores information including, without limitation, contracts, transactions, supporting documents, and the like. In accordance with implementations of the present disclosure, and as described in detail herein, each enterprise participating in the B4C platform operates one or more nodes 132 within the blockchain network 112.

As introduced above, implementations of the present disclosure can be realized using an example distributed ledger platform provided as Corda. In general, Corda supports use of smart contracts, which can be provided as computer-executable code. A smart contract can be described as an agreement is automatically executed as computer code with user (human) input and control. In some examples, rights and obligations encoded within a smart contract are legally enforceable. Corda provides a framework for execution of smart contracts. Corda implements a global ledger (blockchain) that is considered a single, reliable source. In some examples transactions and ledger entries are not globally visible to all participants in the blockchain network. For example, it can occur that transactions only involve a sub-group of participants, to which visibility to those transactions is limited.

Corda operates using so-called state objects. A state object can be described as an electronic document that records the existence, content, and current state of an agreement between multiple participants. Each state object is only accessible to participants. In some examples, Corda leverages cryptographic hashes to identify participants and data. In this manner, Corda ensures consistency in a distributed system where not all data is visible to all participants. In Corda, the ledger is defined as a set of immutable state objects, and all participants remain in consensus as to the state as it changes. Corda provides tools to achieve global distributed consensus. An example tool includes smart contract logic to ensure that state transitions are valid according to the pre-determined rules. Another example includes uniqueness and timestamping services to order transactions temporally and eliminate conflicts. Another example tool includes an orchestration framework that simplifies writing of complex multi-step protocols between multiple different participants.

As introduced above, a consensus protocol is implemented to enable participants to reach consensus. In Corda, updates are applied using transactions, which consume existing state objects and produce new state objects. In view of this, Corda provides a transaction validity aspect on consensus, and a transaction uniqueness aspect on consensus. With respect to transaction validity, participants can reach certainty that a proposed update transaction defining output states is valid by checking that the associated contract code runs successfully and has all the required signatures. Further, participants can check that any transactions to which a transaction refers are also valid. With regard to transaction uniqueness, participants can reach certainty that the transaction in question is the unique consumer of all its input states. That is, participants can confirm that there are no other transactions, over which consensus has previously been reached, and which consumes any of the same states. To this end, Corda provides uniqueness services that can selectively be implemented to attest to whether the states consumed by a given transaction have previously been consumed.

Figure 2:
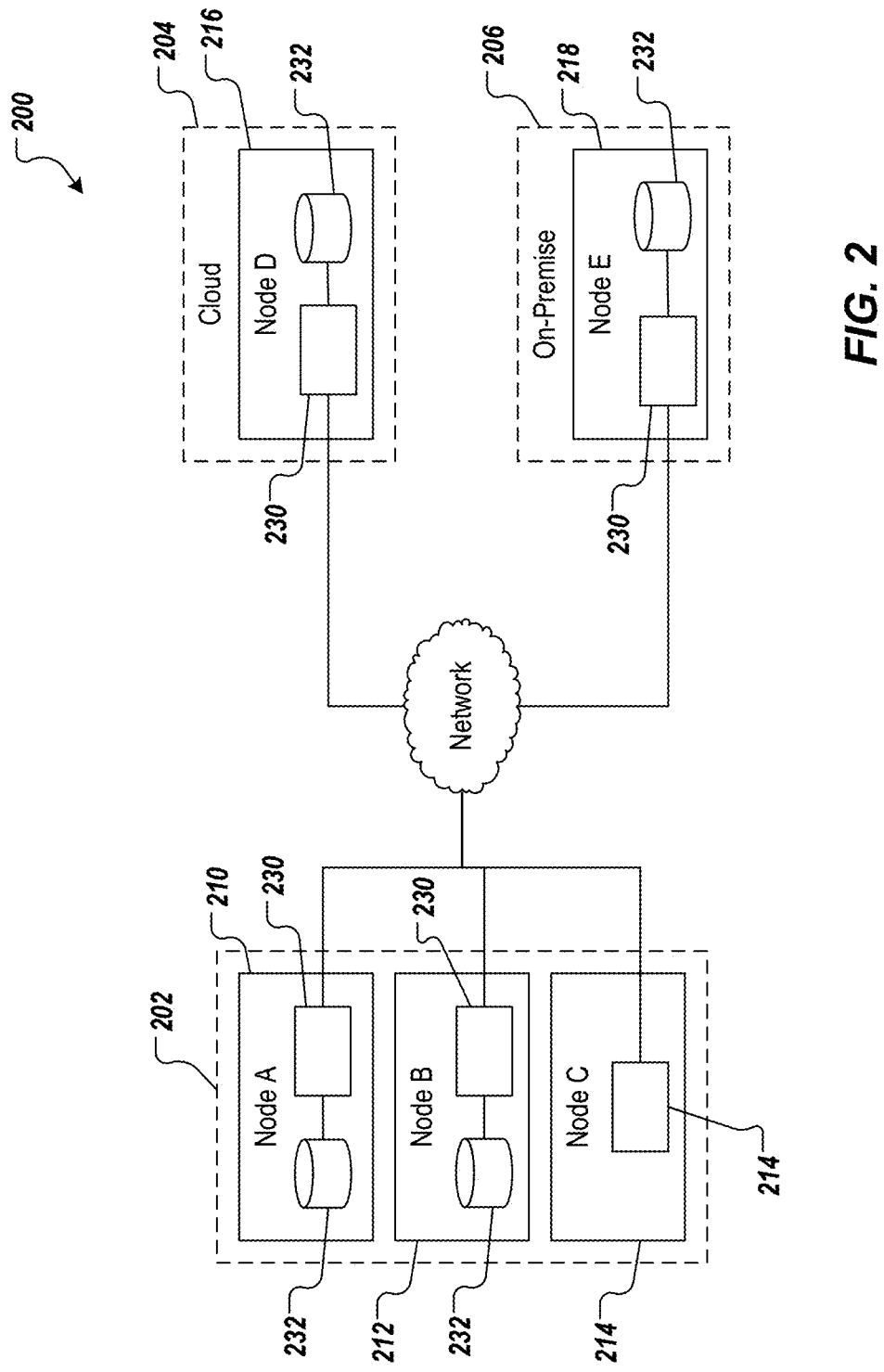
FIG. 2 depicts an example conceptual architecture in accordance with implementations of the present disclosure.

FIG. 2 depicts an example conceptual architecture 200 in accordance with implementations of the present disclosure. In the example of FIG. 2, three enterprises (peers) 202, 204, 206 are involved. The enterprise 202 can be described as a host enterprise, which provides the B4C platform. In the depicted example, the enterprise 202 provides multiple nodes 210, 212, 214. In some examples, the node 210 corresponds to the enterprise 202 itself, the node 212 corresponds to a distinct legal entity of the enterprise 202 (e.g., a subsidiary), and the node 214 corresponds to one or more services the enterprise 202 provides in support of the B4C platform. An example service can include a notary service that is used as described herein. The enterprises 204, 206 are associated with respective nodes 216, 218. As described herein, each node is a node within a distributed ledger platform (e.g., a node within Corda, described above). In the depicted example, the node 216 is provided in a cloud-hosted (off-premise) system. For example, a cloud service provider (e.g., Amazon Web Services (AWS)) can host the node 216 on behalf of the enterprise 204. The node 218 is provided in an on-premise system, for example, owned and operated by the enterprise 206.

User access to the B4C platform can be managed using access control. Example access control paradigms can include centralized access control, semi-distributed access control, and fully distributed access control. In some examples, in centralized access control, the host enterprise can control access of every user to the B4C platform including its own users, and users of other enterprises. In this example, each user is granted access (e.g., credentials) by the host enterprise, which supports and manages all user access to the B4C platform. This can be burdensome to the host enterprise in terms of technical resources. In some examples, in fully distributed access control, each enterprise (every peer) provides and manages their own access control to the B4C platform, each newly added enterprise (peer)

being approved by a central manager (e.g., the host enterprise). Fully distributed access control, however, lacks transparency into whether all enterprises are implementing acceptable levels of security.

In some implementations, in semi-distributed access control, a central directory (e.g., an Azure Active Directory) is provided, and can be configured to enable user access of each enterprise to a respective node. For example, the host enterprise can configure the central directory. In some examples, the central directory enables each enterprise to grant/revoke user access to its own users, and provides a single access control protocol across all nodes. In this manner, the above-described deficiencies of centralized access control, and fully distributed access control are obviated.

As introduced above, the B4C platform can be implemented using the Corda platform. In some implementations, each node 210, 212, 214, 216, 218 executes a Corda distributed application (CorDapp) 230, which can be described as a distributed application that runs on the Corda platform. The CorDapp enables the nodes to reach consensus as to updates that are to be recorded in the ledger (e.g., in respective databases of the nodes). This is achieved through process flows that the nodes can invoke through remote procedure calls (RPCs).

In accordance with Corda, the ledger is subjective from each node's (participant's) perspective. That is, for example, participants are guaranteed to see the exact same version of any on-ledger facts that they share. For example, participants in a transaction will see the exact same version of on-ledger facts (e.g., data recorded to the ledger) for the transaction. Any participants that did not participate in the transaction will not see the on-ledger facts for the transaction. In Corda, each node 210, 212, 216, 218 maintains a separate database 232 of known facts. As a result, each participant only sees a subset of facts on the ledger, and no participant is aware of the ledger in its entirety. In this manner, a single, central store of data is avoided.

In Corda, one or more notary services can be provided. In the example of FIG. 2, the node 214 provides a notary service 234. In general, a notary service is executed to prevent "double-spends," and can validate transactions. More particularly, a notary service provides uniqueness consensus by attesting that, for a given transaction, the notary service has not already signed other transactions that consume any of the proposed transaction's input states. For example, in response to receiving a request to notarize a transaction, the notary service determines whether any of the input states were included in a previously signed transaction (e.g., a "double spend" of an input state). If the input states are not included in a previously signed transaction, the notary service signs the transaction. If one or more input states are included in a previously signed transaction, the notary service rejects the transaction and flags that a double-spend attempt has occurred.

In this manner, the notary service provides a point of finality in the B4C platform. Until the signature of the notary service is obtained, the participants in a transaction cannot be sure that an equally valid, but conflicting transaction will not be regarded as the "valid" attempt to spend a given input state. After the signature of the notary service is obtained, it is ensured that the input states of the proposed transaction had not already been consumed by a prior transaction.

In some examples, the notary service executes a consensus protocol. In some examples, the notary service can select between multiple consensus protocols (e.g., based on privacy, scalability, legal-system compatibility, algorithmic agility). For example, the notary service can execute a high-speed, high-trust algorithm such as RAFT, a low-speed, low-trust algorithm such as Byzantine fault tolerance (BFT), or any other appropriate consensus protocol.

As noted above, a transaction is a basic data structure of the B4C platform of the present disclosure as implemented in Corda. In general, a transaction can be passed between nodes to be signed and verified. However, and as also noted above, all data should not be revealed to other nodes that take part in the creation of transaction on validation level (e.g., a Corda oracle that only validates embedded commands). To achieve this, a hash tree (Merkle tree) is used to provide proof of inclusion and data integrity. In some implementations, transactions are split into leaves, each leaf containing either input, output, command, or attachment. Other fields like timestamp or signers are not used in the calculation. The hash tree is constructed by hashing the concatenation of nodes' hashes below the current node together, as described above, to ultimately provide a root hash. The root hash is the identifier of the transaction and is used for signing and verification of data integrity. Every change in transaction on a leaf level will change the root hash.

Figure 3A:
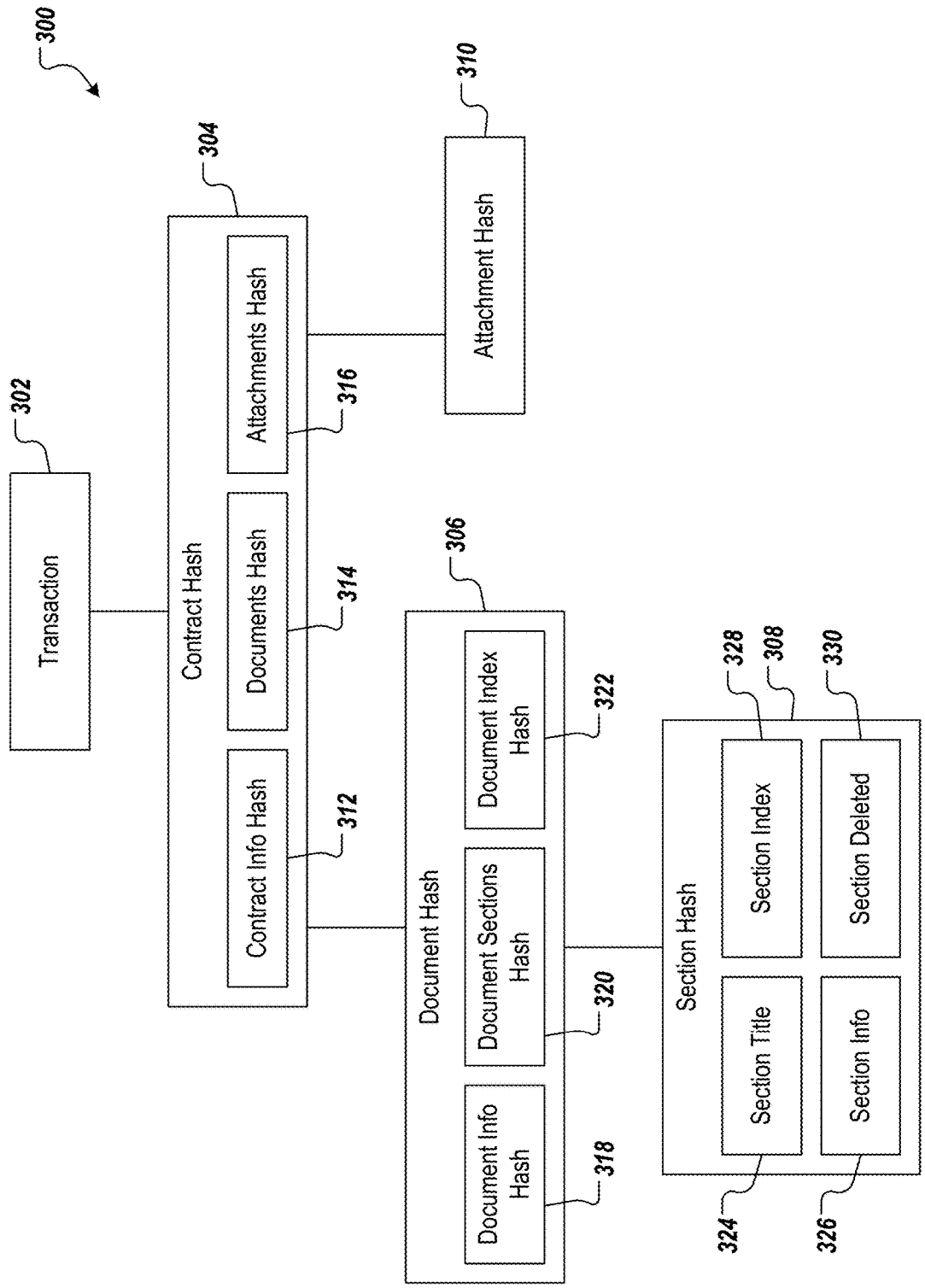
FIGS. 3A and 3B depict an example hash tree hierarchy in accordance with implementations of the present disclosure.
Figure 3B:
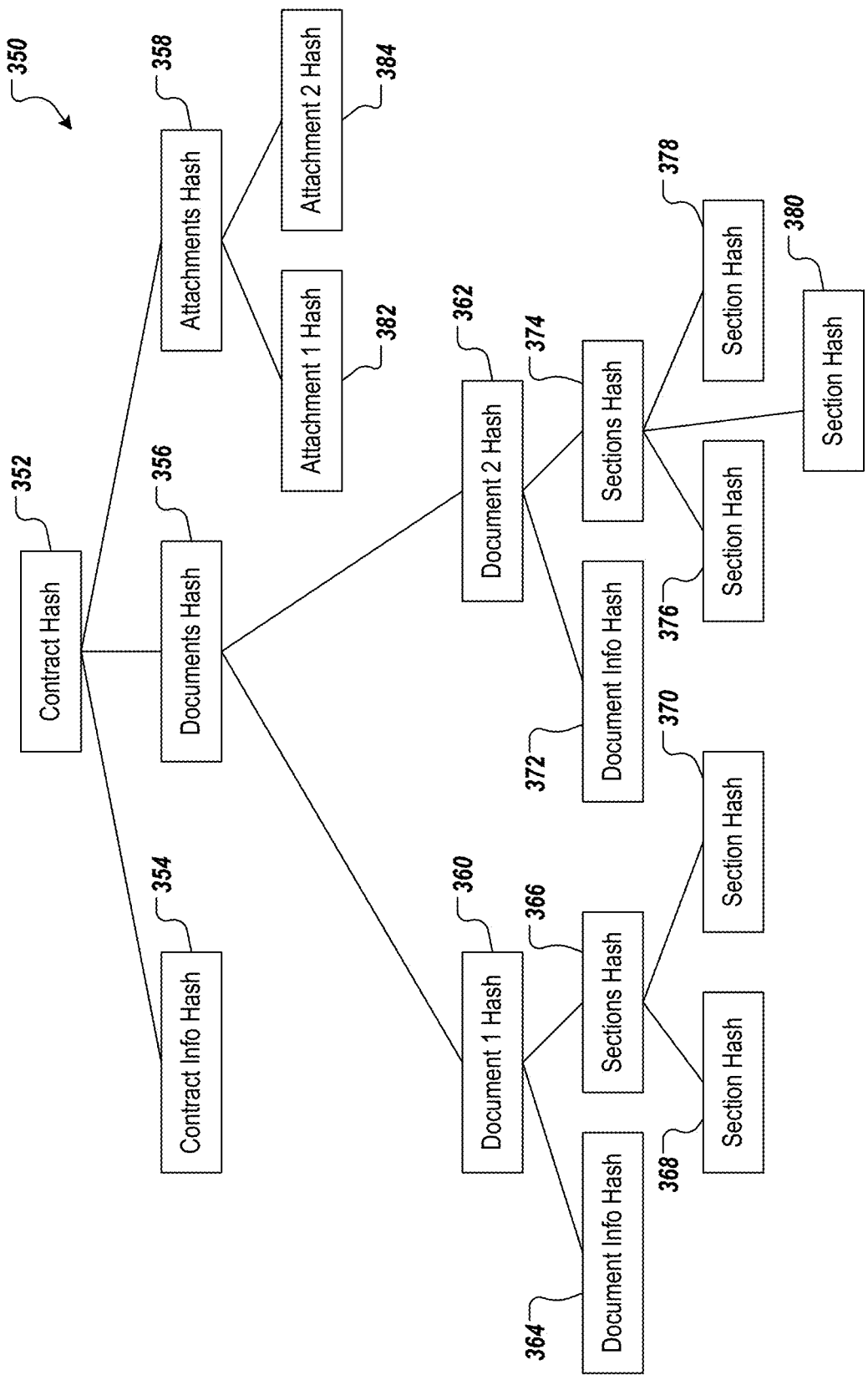

FIGS. 3A and 3B depict an example hash tree hierarchy in accordance with implementations of the present disclosure. More particularly, FIG. 3A depicts an example hash tree map 300, and FIG. 3B depicts an example hash tree 350 in accordance with implementations of the present disclosure.

With particular reference to FIG. 3A, the example hash tree map 300 includes a transaction hash 302 (e.g., transaction identifier), a contract hash 304, a document hash 306, a section hash 308, and an attachment hash 310. In general, the transaction hash 302 represents the state of a transaction based on a contract, contract information, documents associated with the contract, and attachments to the contract. In some examples, the transaction hash 302 changes as a result of any changes to the underlying hashes.

In further detail, the contract hash 304 includes a contract information hash 312, a documents hash 314, and an attachments hash 316. In some examples, the contract information hash 312 is provided based on contract information associated with the respective contract. Example contract information includes, without limitation, title, type (e.g., NDA, joint development agreement, goods/services), sender, sender legal entity, asset type (token), asset type (contract), receiver, receiver legal entity, effective date, and expiration date. For example, the contract information can be concatenated and processed through the hash function to provide the contract information hash 312. In some examples, the documents hash 314 is a hash of all documents underlying the contract. For example, the documents hash 314 can be based on one or more document hashes 306. That is, and as described in further detail herein, for each document, a document hash 306 is provided, and the documents hash 314 is provided as a hash of the document hash(es) 306. In some examples, the attachments hash 316 is a hash of all attachments underlying the contract. For example, the attachments hash 316 can be based on one or more attachment hashes 310. That is, and as described in further detail herein, for each attachment, an attachment hash 310 is provided, and the attachments hash 316 is provided as a hash of the attachment hash(es) 310.

In some examples, the document hash 306 includes a document information hash 318, a document sections hash 320, and a document index hash 322. In some examples, the document information hash 318 is provided based on document information associated with a respective document. Example document information includes, without limitation, document title, document creation date, document deletion date, and document author. In some examples, the document sections hash 320 can be based on one or more section hashes 308. That is, and as described in further detail herein, for each section of a document, a section hash 308 is provided, and the document sections hash 322 is provided as a hash of the section hash(es) 308.

In some examples, a section hash 308 is provided for each section of a document. In the example of FIG. 3A, the section hash 308 includes a section title hash 324, a section information hash 326, a section index hash 328, and a section deleted hash 330. In some examples, the section title hash 324 is provided as a hash of the title of the respective section (e.g., Scope of Work, Pricing, Indemnification). In some examples, the section information hash 326 is provided as a hash of section information associated with the respective section. Example section information can include, without limitation, metadata including document title and whether document is deleted. In some examples, the section index hash 328 is provided as a hash of an index of the section (e.g., index of sub-sections, sub-subsections, etc.). In some examples, the section deleted hash 330 is a hash value indicating whether the section has been deleted.

In some examples, the attachments hash 310 is provided as a hash of a respective attachment to the contract.

In some implementations, and although not depicted in FIG. 3A, a status hash can be provided for each of contract, document, section, and attachment. In some examples, the status hashes are incorporated into the information hash of the respective parent level. In some examples, a change to the status of a contract, document or section does not create a new hash code.

In some implementations, the section index hash 328 can be included directly in the document hash 306 instead of the section hash 308. In this manner, the sections of the document can be re-ordered (indexed) without affecting the hash for that section, but only affecting the hash of the document.

As noted above, the example hash tree map 300 of FIG. 3A is an example, and implementations of the present disclosure can be realized using hash tree maps of different granularity. For example, a more granular hash tree map can include paragraph hashes, sentences hashes, word hashes, and/or character hashes.

As noted above, even a slight change results in a completely different hash value being generated. In some implementations, particular data is not included in the hash value calculations. Consequently, any changes in the particular data does not result in corresponding changes in any of the hash values. Example particular data includes, without limitation, contract created, contract shared, contract approved, contract signed, document created, document shared, document approved, document signed, section shared, section approved, attachment uploaded, and attachment approved.

In some implementations, a hash history for status updates for contracts and documents is provided. In this manner, the hash history serves as an auditable record of changes to the status (e.g. approved or signed). In some examples, a hash history is not provided for sections, as section status does not change in the same manner (e.g., a section is just updated or deleted, not approved/signed). In some implementations, hash history for the status updates is detached/separated from the other hash code history for updates to content and metadata. This can be done because nothing may have changed with respect to the actual documents content, title or other information, but the change in status as it moves from drafting to signed is to be recorded. Further, by separating these hash code histories, any update to the status will not also force an update to the document and contract hash codes; and, therefore, avoid moving up the hash tree.

With particular reference to FIG. 3B, the example hash tree 350 represents an example, practical implementation of the example hash tree map 300 of FIG. 3A. The example hash tree 350 is based on two documents (Document 1, Document 2) and two attachments (Attachment 1, Attachment 2). In the depicted example, the hash tree 350 includes a contract hash 352 that is based on a contract information hash 354, a documents hash 356, and an attachments hash 358. The documents hash 356 is provided based on a Document 1 hash 360 and a Document 2 hash 362. The Document 1 hash 360 is provided based on a document information hash 364 and a sections hash 366. The sections hash 366 is provided based on a section hash 368 and a section hash 370. That is, Document 1 includes two sections, a section hash being provided for each. The Document 2 hash 362 is provided based on a document information hash 372 and a sections hash 374. The sections hash 374 is provided based on a section hash 376, a section hash 378, and a section hash 380. That is, Document 2 includes three sections, a section hash being provided for each. The attachments hash 358 is provided based on an Attachment 1 hash 382 and an Attachment 2 hash 384.

Figure 4:
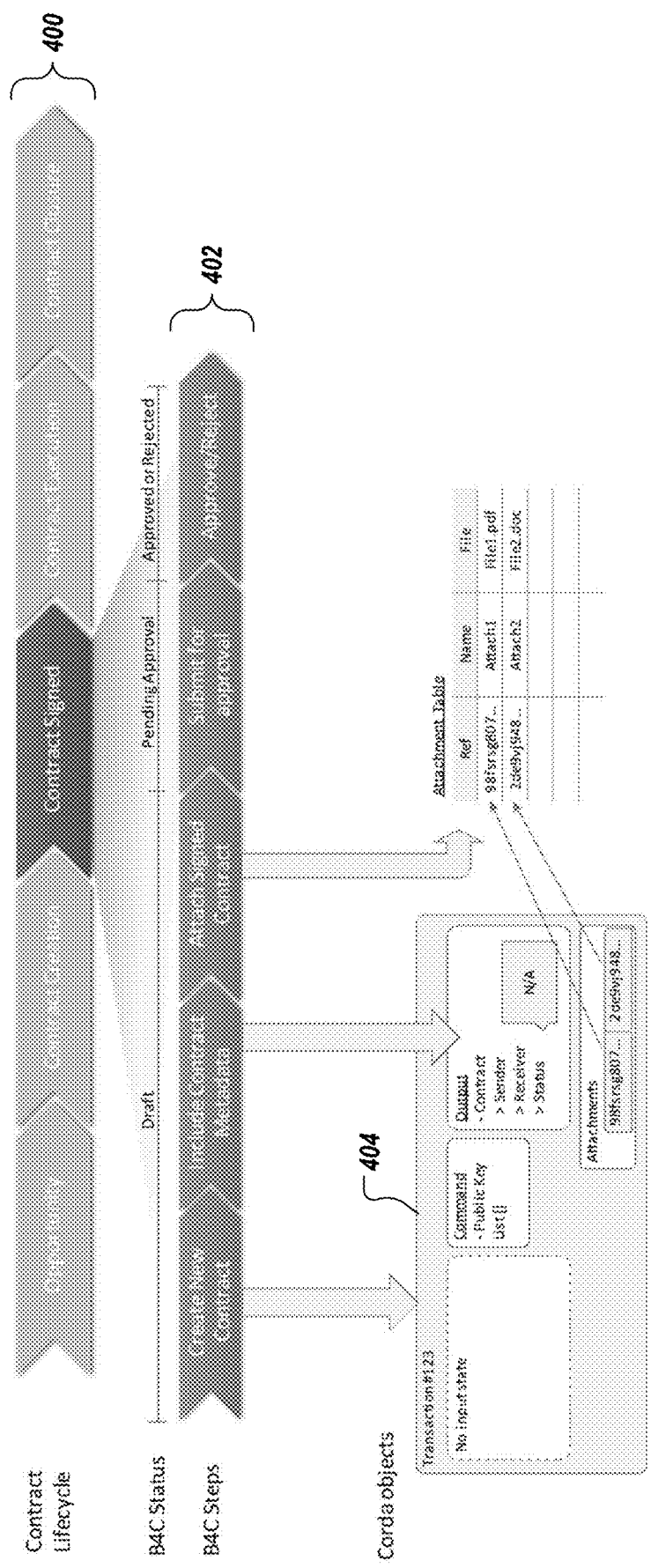
FIG. 4 depicts an example contract lifecycle in accordance with implementations of the present disclosure.

FIG. 4 depicts an example contract lifecycle 400 in accordance with implementations of the present disclosure. The example contract lifecycle 400 includes example stages including, but not limited to, opportunity (e.g., identifying potential contract between enterprises), contract creation (e.g., forming initial contract, revisions to contract), contract signed (e.g., approval process), contract execution (e.g., signatures, notarization), and contract closure (e.g., expiration/nullification of contract). Implementations of the present disclosure are described in further detail herein with reference to the contract signed stage. It is contemplated, however, that the B4C platform of the present disclosure supports all stages of the contract lifecycle 400.

In the example of FIG. 4, the contract signed stage includes an example workflow 402. The workflow 402 includes example steps of create new contract, include contract metadata, attach signed contract, submit for approval, and approve/reject. In some examples, one or more steps correspond to a respective status within the B4C platform. For example, the steps create new contract, include contract metadata, and attach signed contract correspond to a draft status, the step submit for approval corresponds to a pending approval status, and the approve/reject step corresponds to an approved/rejected status.

In some implementations, one or more data objects are provided in the B4C platform. In some examples, each data object is immutably recorded in the distributed ledger (blockchain). An example data object can include a contract provided as an electronic document. In some examples, the B4C platform provides a library of contracts, from which enterprises can select an appropriate contract. Example contracts can include, without limitation, joint development agreements, services agreements, licensing agreements, and asset transfer agreements. In some examples, an object includes a transaction associated with a contract. Example transactions include, without limitation, contract creation, contract revisions, attachments (e.g., computer-readable files attached to a contract), approval, signature, and notarization. In the example of FIG. 4, an example object 404 is depicted, and includes multiple attachments (e.g., files), as described in further detail herein.

In accordance with implementations of the present disclosure, an example workflow can include a sender, a receiver, and a notary. In some examples, the sender and receiver represent entities that are to be parties to a contract that is created using the B4C platform of the present disclosure. For example, the sender can represent a node (e.g., the node 212 of FIG. 2) and the receiver can represent a node (e.g., the node 218 of FIG. 2). The notary represents a notary service, described herein (e.g., the notary service 234 provided by the node 214 of FIG. 2). In some examples, the sender and receiver can change. That is, during the contract lifecycle, a node can be a sender at one point in time, and a receiver at another point in time.

In the B4C platform of the present disclosure, each transaction is atomic in that either the transaction proposed is accepted as a whole, or not accepted at all. In creating a contract, and as depicted in FIG. 4, the first transaction has no input state, and the output will include all details of the contract that is being proposed. While a contract is in-process, the contract status is provided as not available (N/A) as drafts are still off-chain and can be deleted. That is, and in some examples, a contract is not added to the blockchain until executed (and approved). In some examples, attachment files are physically stored in a table inside respective node, and transactions only reference the attachments, if any, as depicted in FIG. 4. As also depicted in FIG. 4, command contains a list of public keys of all the peers involved in the transaction that will be required to sign.

An example workflow is described in further detail herein with reference to FIGS. 5A-5F, which depict an example objects and logic flow in accordance with implementations of the present disclosure. The example of FIGS. 5A-5F depicts approval of a created contract between two enterprises, a sender enterprise (sender), and a receiver enterprise (receiver). Each action depicted in the example of FIGS. 5A-5F is recorded in the blockchain, and has a corresponding hash code associated therewith (e.g., provided through the hash tree).

Figure 5A:
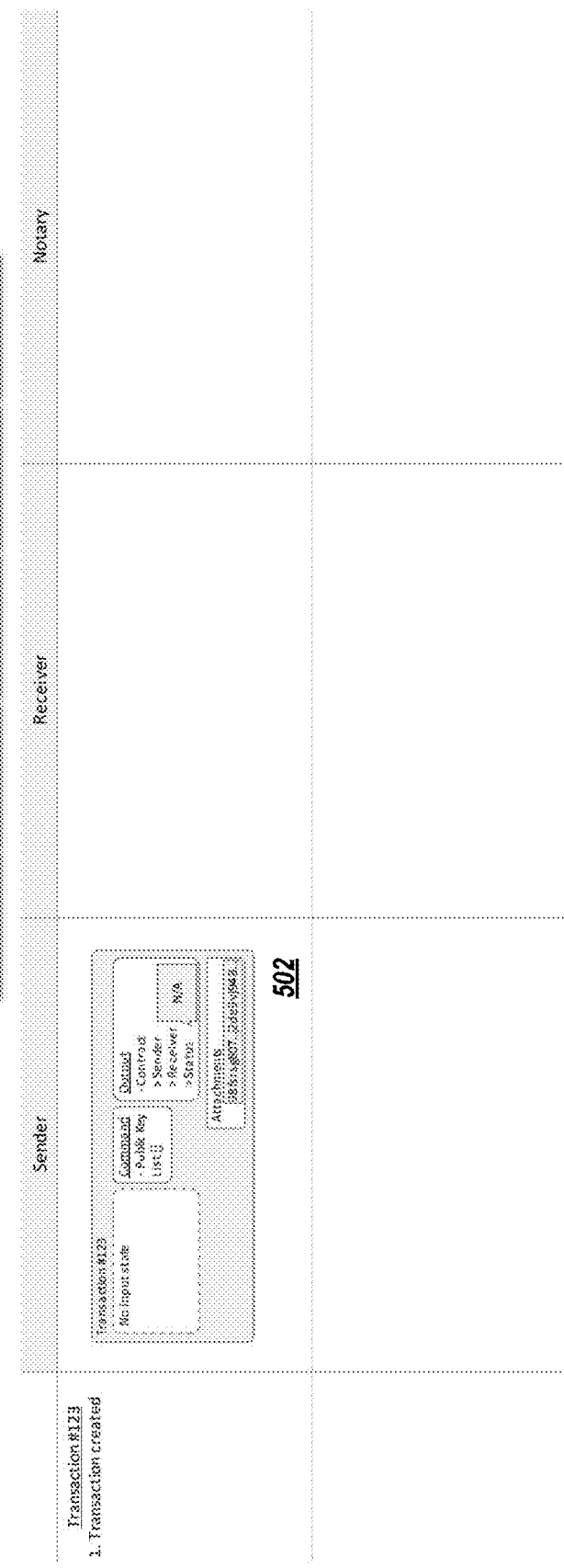
FIGS. 5A-5F depict an example objects and logic flow in accordance with implementations of the present disclosure.
Figure 5B:
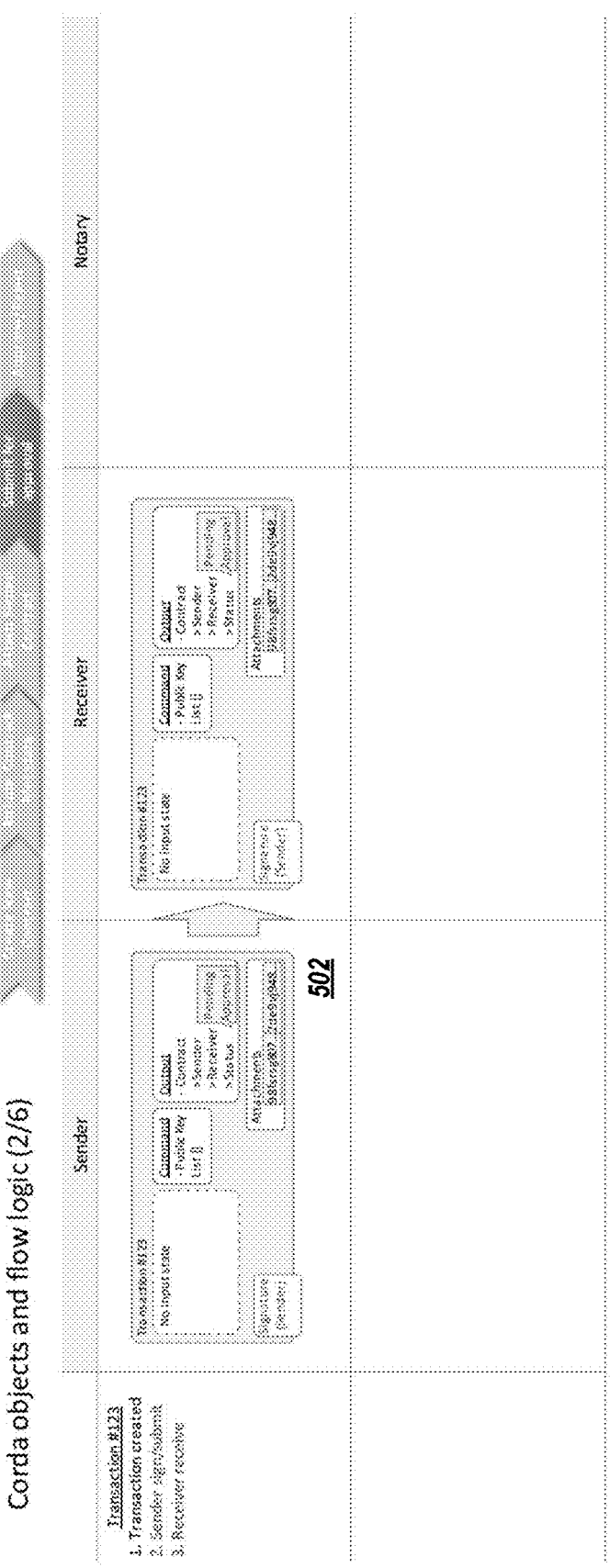

In the example of FIG. 5A, a first logic step 502 includes an object that corresponds to a transaction (Transaction #123). In some examples, the object corresponds to a contract that was created within the B4C platform, and includes attachments. In some examples, the sender creates the contract, one or more documents, and uploads attachments using one or more GUIs provided by the B4C platform, examples of which are provided herein. In some examples, after creation of the contract, the sender can save the contract as a draft (e.g., contract status=draft), delete the contract (e.g., contract status=deleted), or share the contract (e.g., contract status=shared). For example, the sender can share the contract with a receiver to request the receiver's approval, and/or editing of the contract. With reference to FIG. 5B, the sender signs the contract (e.g., using its private key), and the sender's signature. The sender's signature is added to the object, and a status of the object changes to "pending approval." The contract is submitted for approval. In some examples, the receiver is notified that the contract is pending approval.

The transaction, Transaction #123, has a corresponding hash value (hash code) generated therefor. For example, and as described above with reference to FIGS. 3A and 3B, upon completion of the transaction (e.g., creation of the contract), the transaction hash code is generated and is stored to provide for auditing of transactions, including the Transaction #123. In the example of FIG. 5A, the Transaction #123 has no input state, and an output state that includes contract, sender, receiver, and status (e.g., pending approval).

In some implementations, in response to receiving a notification of the contract, the receiver can access the contract and any supporting documents using one or more GUIs provided by the B4C platform. For example, the receiver can view the documents, and document sections. In some examples, the receiver can decide to approve the documents as received, edit the documents, or discard the contract as a whole. In some examples, another transaction is created, Transaction #124, which has its own transaction hash code generated therefor, which is distinct from the transaction hash code provided for the Transaction #123. In the depicted example, the Transaction #124 has an input state that corresponds to the output state of the Transaction #123.

In some implementations, in response to receiving a notification of the contract, the receiver can edit the contract. For example, the receiver can edit sections of one or more documents to modify terms of the underlying agreement. In some examples, after editing of the document(s), a notification is triggered to the B4C platform, which determines whether all documents have been approved. In this case, because the receiver edited the document(s), approval is needed from the sender for the edits. Consequently, the sender is notified, and can review the documents for their approval.

In some examples, approval of the document(s), without editing, results in the receiver's signature being added to the object, the Transaction #124, and the B4C platform being notified that the document is approved and signed by the receiver. For example, and with reference to FIG. 5C, the receiver signs the object in a second logic step 504 (e.g., using its private key). In response, a receiver signature is added to the object, and a status of the object changes to "approved." Accordingly, the output state of the Transaction #124 includes contract, sender, receiver, and status (e.g., approved).

Figure 5C:
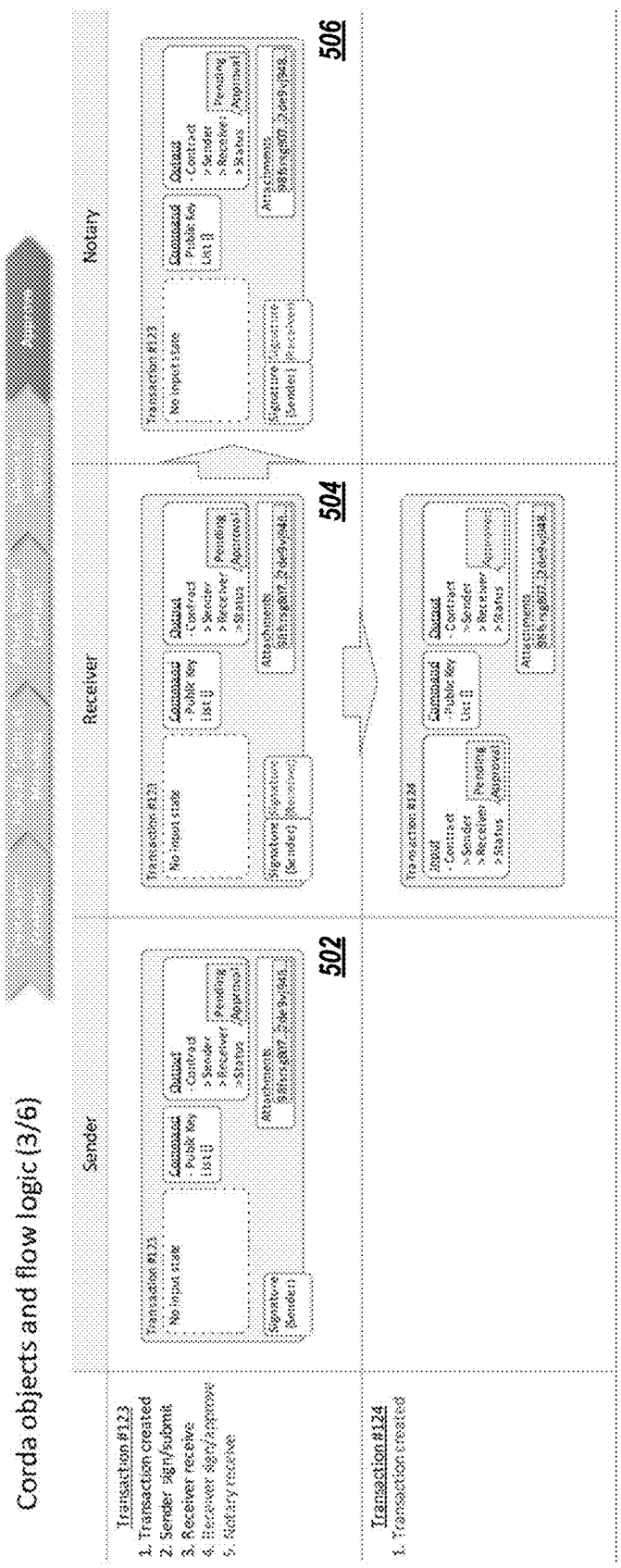
Figure 5D:
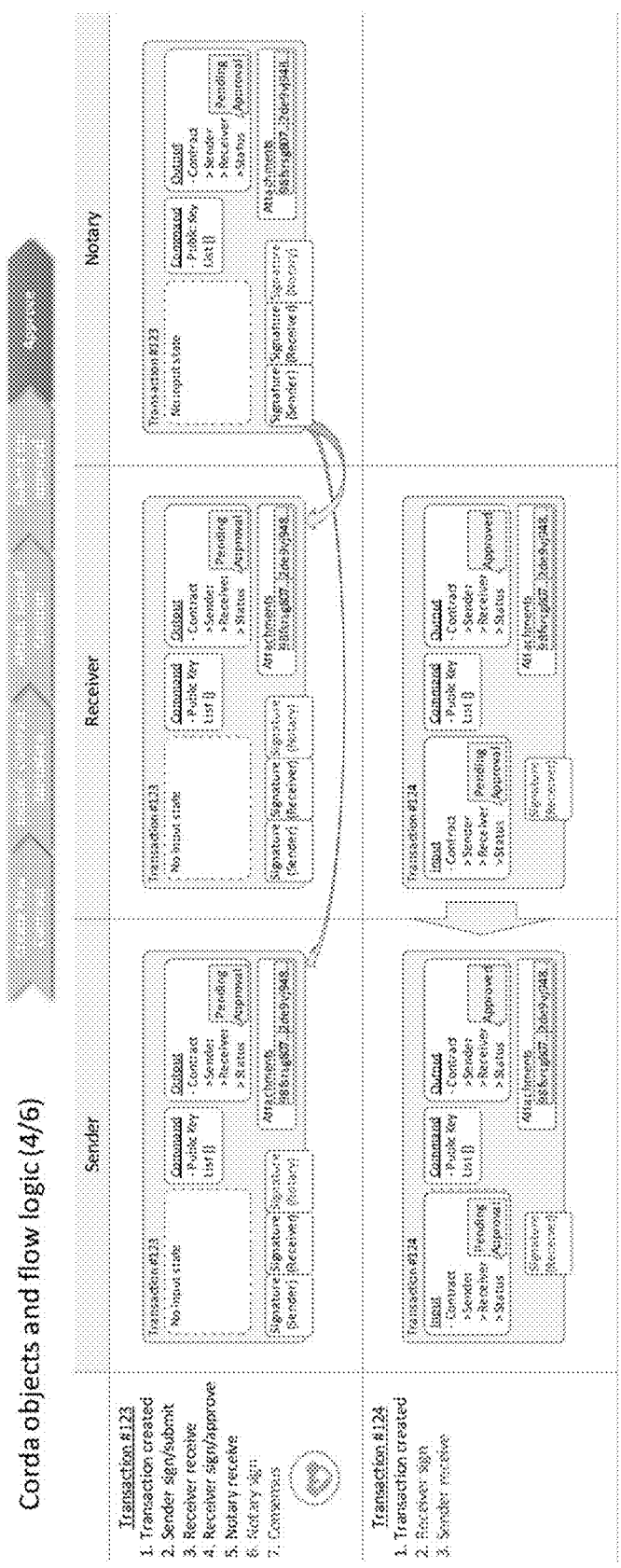
Figure 5E:
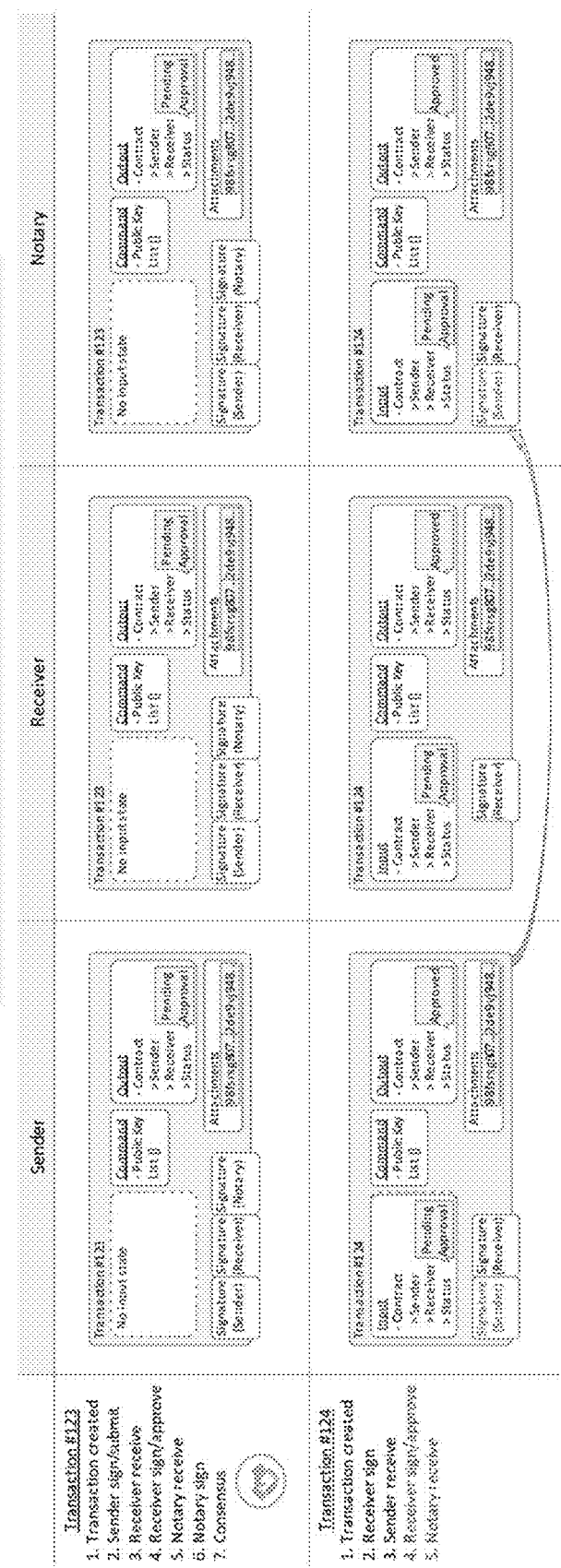
Figure 5F:
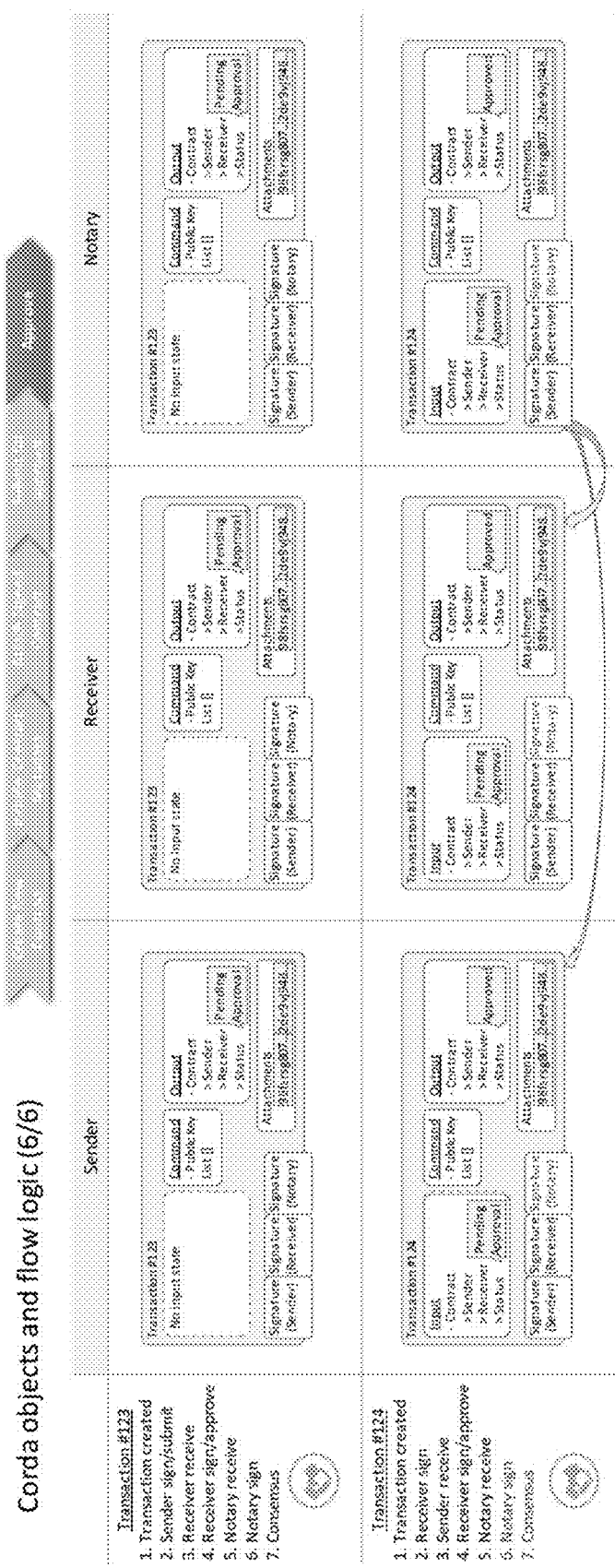

In some examples, the receiver's signature is added to the object of the Transaction #123, as depicted in FIG. 5C, and the object is provided to the notary service. The notary service adds its signature (e.g., using its private key), and the object (Transaction #123) is updated across the sender and the receiver to include all signatures (e.g., sender signature, receiver signature, notary signature), as depicted in FIG. 5D. As also depicted in FIG. 5D, the Transaction #124 is replicated to the sender. As depicted in FIGS. 5E and 5F, the Transaction #124 is signed by the sender, and is submitted to the notary service. The notary service checks the Transaction #124, as described herein, and signs the Transaction #124. The object (Transaction #124) is updated across the sender and the receiver to include all signatures (e.g., sender signature, receiver signature, notary signature), as depicted in FIG. 5F. This represents successful execution of the consensus processing by the notary service, as described herein.

In some implementations, in response to approval, the B4C platform determines whether all documents of the contract have been approved. For example, the contract can include multiple documents (e.g., Document 1, Document 2 of FIG. 3B), each of which is to be approved by the peers involved in the contract. If all documents are not approved, the B4C platform can alert a peer (e.g., sender, receiver) that their review/approval is pending.

If all documents are approved, the B4C platform notifies each peer that a final approval is pending. In some examples, an approval button is provided in a GUI that each peer can use to review and approve the contract as a whole. In response to each peer approving the contract (e.g., each peer clicking on respective approval buttons), the contract status is updated to approved, and the transactions and contract are provided to the notary service for consensus processing, as described above. Consensus is achieved in the B4C platform, and the contract is complete and stored in the blockchain.

Figure 6:
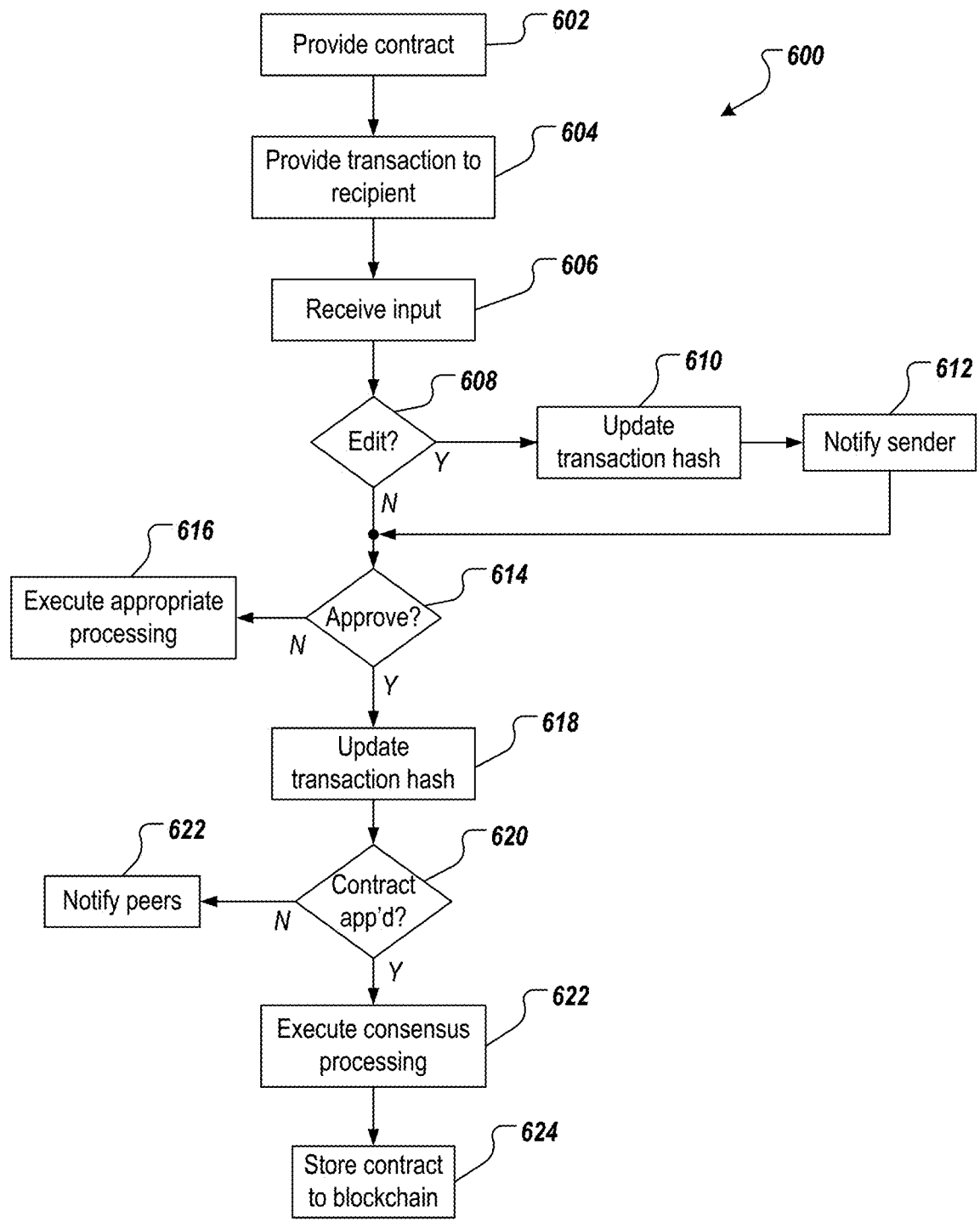
FIG. 6 depicts an example process in accordance with implementations of the present disclosure.

FIG. 6 depicts an example process 600 in accordance with implementations of the present disclosure. The example process 600 can be executed by a contract management platform of the present disclosure (e.g., the B4C platform).

A contract is provided (602). For example, a sender (e.g., node 212 of FIG. 2) accesses the B4C platform of the present disclosure and creates a contract. In some examples, the sender interacts with the B4C through one or more GUIs to generate a contract that includes one or more underlying documents. In some examples, the contract includes one or more attachments. In some examples, and as described herein, a transaction object is created at the sender, which represents the contract (e.g., the Transaction #123, described above, having an empty (N/A) input state, and an output state). In some examples, the contract is associated with at least one other peer, referred to as a recipient (e.g., the node 218 of FIG. 2). In some examples, in response to creation of the contract, a transaction hash code is determined based on hashing of contact information, documents, and attachments, if any, as described herein (e.g., with reference to FIGS. 3A and 3B). At this point, the transaction hash code represents an initial condition of the contract and serves as a starting point for a transaction hash history. Further, underlying hash values (e.g., document hash, attachment hash) serve as starting points for respective hash histories.

The transaction is provided to one or more receivers (604). For example, each receiver identified with the contract is notified of the contract and is able to log into the B4C platform to view the contract and underlying documents and attachments, if any. Input is received (606). For example, a receiver can log into the B4C platform and view documents underlying the contract and can provide input to the B4C platform. In some examples, input can include edits to the one or more documents (e.g., editing contract terms within one or more sections of a document) using a web-based editor provided by the B4C platform, approval of the one or more documents (e.g., by selecting an approve button), or rejecting the contract.

It is determined whether the contract is edited (608). If the contract is edited, the transaction hash is updated (610) and the sender is notified (612). For example, the transaction hash is updated to reflect changes to the document, and thus, the contract, and the updated hash provides another entry of the hash history. The sender is notified of the revised contract (e.g., edited documents) to enable the sender to review and approve the edits, or further edits the documents. If the contract is not edited, it is determined whether the one or more documents are approved (614). That is, it is determined whether the received input (606) indicates approval of the document(s). If all documents are not approved, appropriate processing is executed (616). For example, if the user input indicates a rejection of the contract, the sender is notified, the status of the contract is updated to discarded (rejected), and the transaction hash is updated.

If the document(s) are approved, the transaction hash is updated (618). It is determined whether the contract is approved (620). For example, upon approval by all peers of all documents, the B4C platform can enable respective contract approval interfaces (e.g., approval buttons) that enable each peer to review the completed contract and underlying documents and approve the contract in its entirety. If the contract is not approved, each peer involved in the contract is notified (622). For example, the B4C platform sends reminders to each peer that their approval is pending.

If the contract is approved, consensus processing is executed (624). For example, the notary service signs the transaction objects generated during the contract creation, editing, and approval process. Further, the transaction objects are updated across all peer nodes involved in the contract, such that each transaction object is consistent across all peer nodes, and includes the signatures of the sender, the receiver(s), and the notary service. In this manner, the state of all transaction objects is consistent across all peer nodes. The contract is stored to the blockchain (626). for example, the notary service stores the contract and underlying documents and attachments to the blockchain.

FIGS. 7A-7G depict example user interfaces (UIs) in accordance with implementations of the present disclosure. In some examples, the UIs are displayed to a user associated with an enterprise (e.g., an employee of the enterprise) that enables the user to interact with the B4C platform. For example, the UIs can be displayed in a web application provided through a computing device executing a web browser. In some examples, the user provides credentials (e.g., username, password) for authentication to the B4C platform. If the user is authenticated, the user is granted access to the B4C platform through the UIs.

Figure 7A:
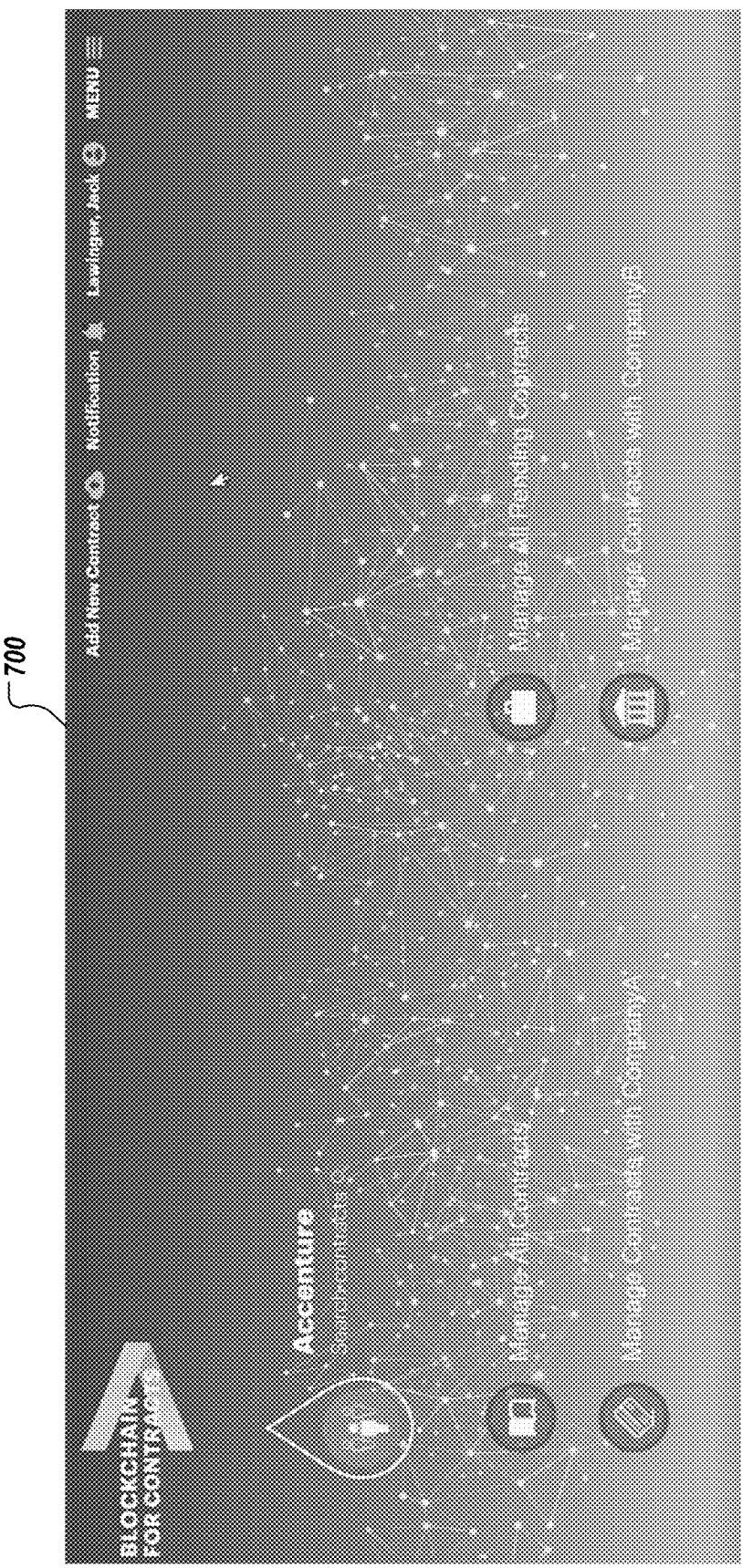

FIG. 7A depicts an example landing UI 700 that can be displayed, for example, in response to authentication of the user to the B4C platform. The example landing UI 700 provides UI elements that enable the user to navigate the B4C platform. In the depicted example, UI elements enable the user to search for contracts (e.g., contracts created and executed within the B4C platform), manage all contracts (e.g., executed contracts), manage all pending contracts (e.g., contracts that are pending approval), and manage contracts with specific peers (e.g., Company A, Company B). The landing UI further includes a UI element for the user to initiate adding of a new contract (e.g., Add New Contract) directly from the landing UI.

Figure 7B:
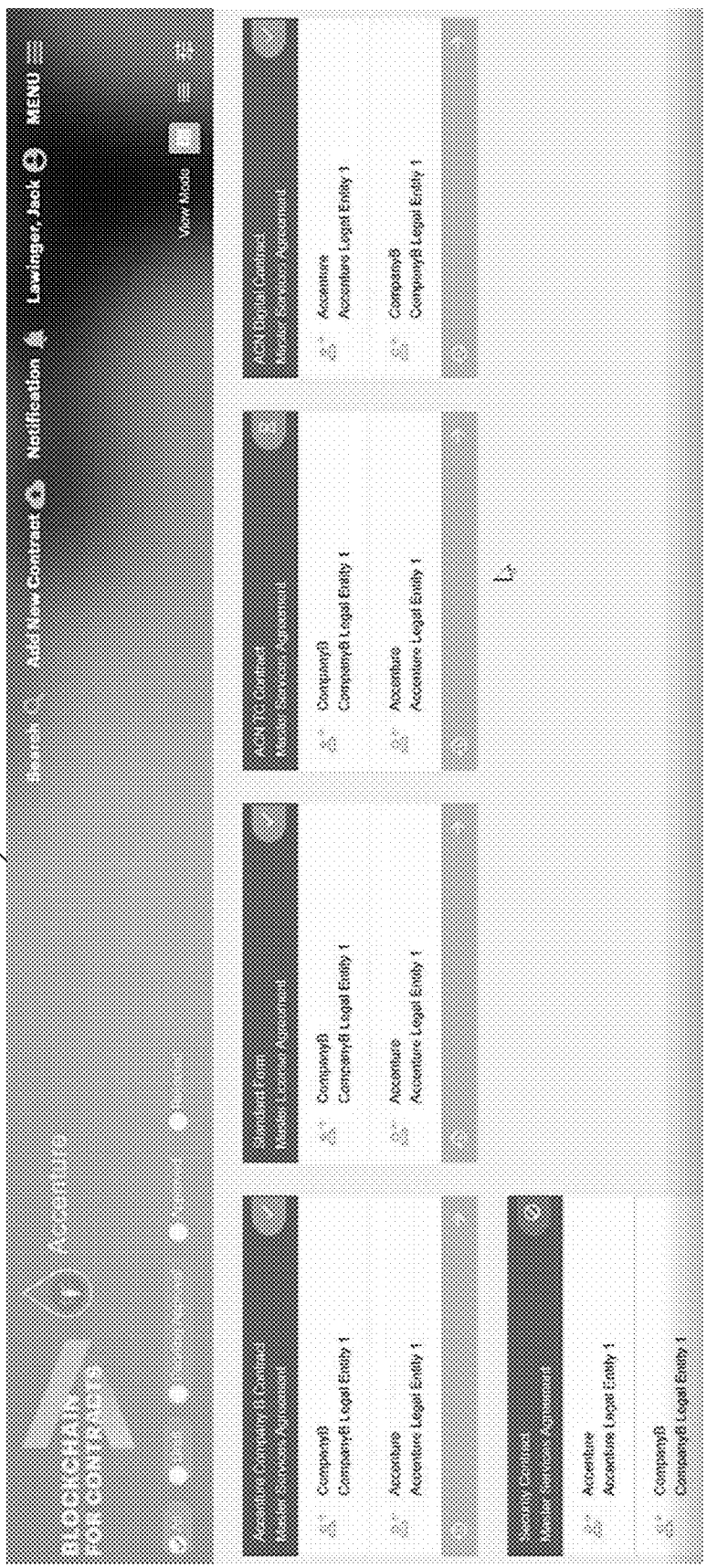

FIG. 7B depicts an example manage all contracts UI 602. In some examples, the manage all contracts UI 702 can be displayed in response to user selection of the manage all contracts UI element of the landing UI 700. In the depicted example, manage all contracts UI 702 provides graphical representations of all contracts of the enterprise (e.g., the enterprise the user works for) within the B4C platform. For example, a filter "all" is selected resulting in the graphical representations of all contracts being displayed. In some examples, the user can select filters to filter which graphical representations are displayed (e.g., draft, pending approval, approved, rejected).

In some implementations, each graphical representation provides an indicator indicating a status of the respective contract (e.g., draft, approved, pending approval, rejected). For example, a checkmark can indicate an approved contract, an hour glass can indicate a contract that is pending approval, and a stop symbol (e.g., circle with line) can indicate a rejected contract. In some examples, each graphical representation provides names of the parties to the contract, a type of the contract, legal forms of the parties, and the like.

FIG. 7C depicts a contract details UI 704, which can be displayed in response to user selection of a graphical representation provided in the manage all contracts UI 702 of FIG. 7B. In the depicted example, an example pending contract is displayed. In some examples, the contract details UI 704 displays more detailed information of the contract including, but not limited to, contract title, contract type, contract status, sender information, receiver information, effective date, expiration data, and contract documents. In the depicted example, three contract documents have been uploaded to the B4C channel for the subject contract (CAN TC Contract), and two of the documents have been reviewed and approved. In some examples, the user can select the third document for review, and/or can upload additional documents. In some implementations, the contract details UI 704 also includes a reject UI element, and an accept UI element. The user can select the reject UI element to reject the contract (changing the status from pending approval to rejected), or can select the accept UI to accept the contract (changing the status from pending approval to accepted).

Figure 7E:
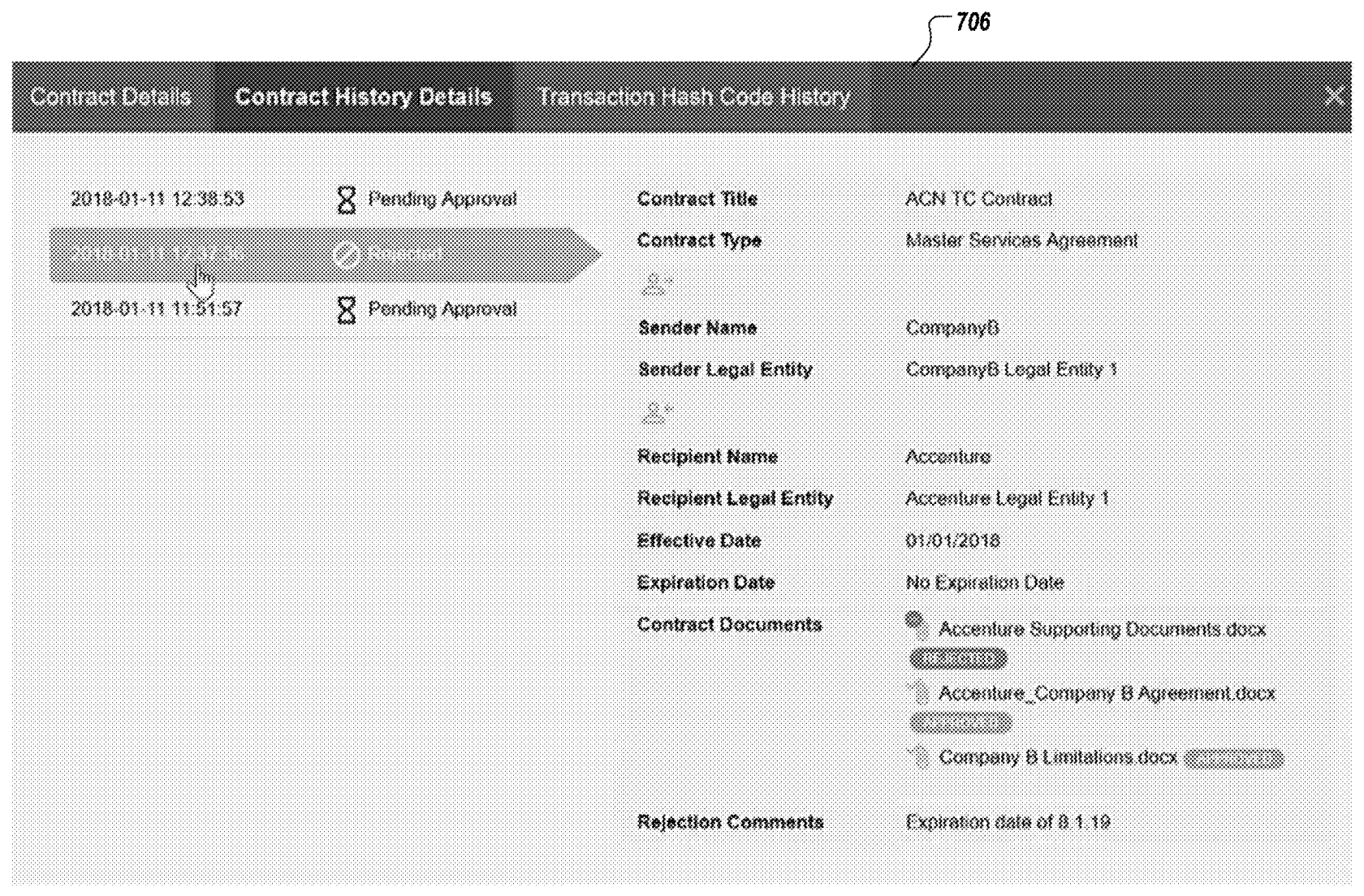

FIGS. 7D and 7E depict an example contract history details UI 706. In the depicted example, the contract history details UI 706 depicts historical details associated with the example pending contract of FIG. 7C. The contract history details UI 706 provides a list of events (e.g., transactions) associated with the contract. In the depicted example, example events include pending approval, and rejected. In some examples, an event can be selected, and detailed information of the contract corresponding to the event is displayed. In the example of FIG. 7D, a pending approval event is selected, and corresponding detailed information is displayed. In the example of FIG. 7E, a rejected event is selected, and corresponding detailed information is displayed.

Figure 7F:
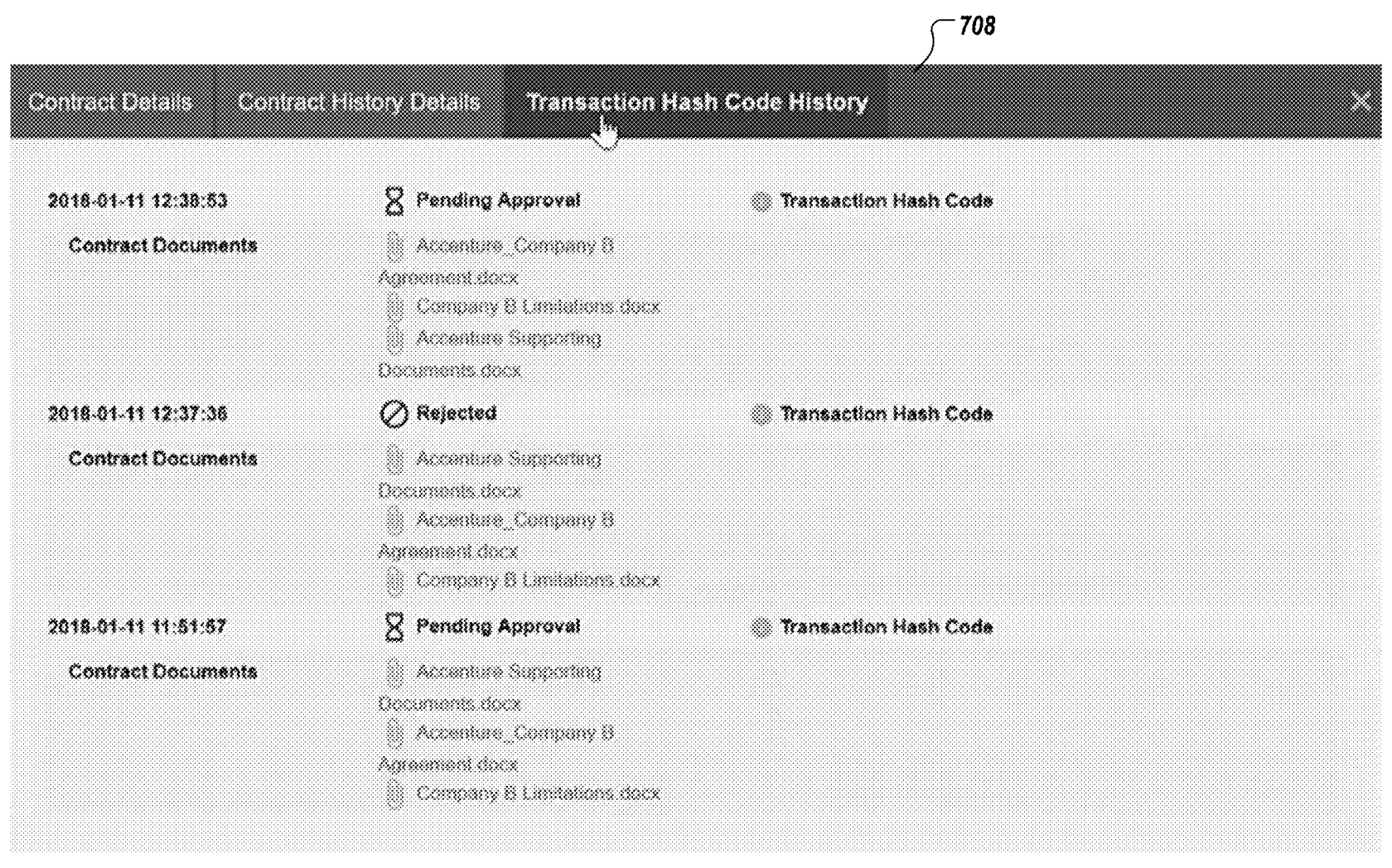
Figure 7G:
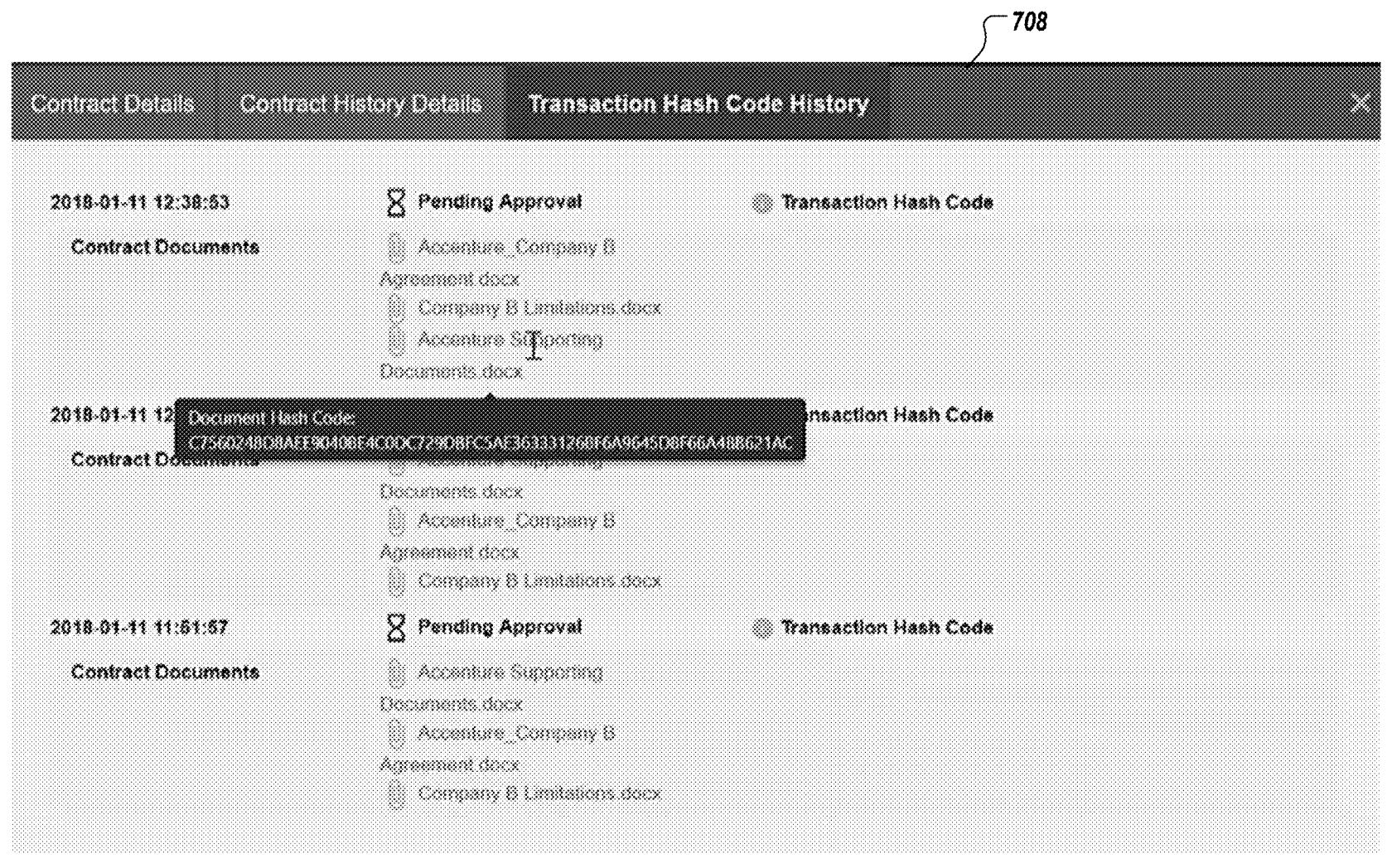

FIGS. 7F and 7G depict an example transaction hash code history UI 708. In the depicted example, the example contract history details UI 706 provides further detail on each of the events included in the list of events displayed in the example contract history details UI 706 of FIGS. 7D and 7E. In some examples, a hash code corresponding to each document associated with the event, and/or a hash code corresponding to a transaction represented by the event can be displayed. In the example of FIG. 7G, a document hash code is displayed for a document of a pending approval event. The hash code is the hash code that was calculated for the document (e.g., hash value calculated when document was uploaded to the contract).

Implementations of the present disclosure can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method executed by one or more processors, the method comprising:
providing, by the one or more processors, a first transaction hash code comprising a digital representation of a digital record between a first peer and a second peer within a digital records platform,
the digital records platform provided by the first peer as a host peer, and
the first transaction hash code being generated based on a hash tree, and hash codes that are generated based on one or more documents underlying the digital record, hash code of the one or more documents at least partially represented as nodes on the hash tree and the first transaction hash code being a root hash of the hash tree;

receiving, by the one or more processors, one or more edits to at least one document from the second peer;

in response to the edits to at least one document from the second peer, updating, by the one or more processors, the first transaction hash code to provide:
- a second transaction hash code based on the first transaction hash code and the hash tree to reflect changes in the at least one document, the hash tree comprising hash code of the at least one document with edits being as one of the nodes on the hash tree, the hash code of the at least one document with edits being updated based on the edits, and
- a transaction hash history comprising the first transaction hash code and the second transaction hash code;

receiving, by the one or more processors, approval of the digital record from each of the first peer and the second peer; and executing a consensus protocol by a notary service of a third node to update transaction objects across the first node and the second node,
- the updating indicating that the transaction objects are consistent, and
- the executing a consensus protocol performed in response to the receiving the approval of the digital record.

2. The method of claim 1, wherein the first and second transaction hash codes are generated based on a plurality of hash codes comprising a documents hash code and an attachments hash code.

3. The method of claim 2, wherein the documents hash code is generated based on hash codes of respective documents underlying the digital record.

4. The method of claim 1, wherein the one or more edits comprise at least one edit to a section of a document, the second transaction hash code being generated based on the at least one edit.

5. The method of claim 1, wherein consistent transaction objects across the first peer and the second peer each comprise a digital signature of the first peer, a digital signature of the second peer, and a digital signature of the notary service.

6. The method of claim 1, wherein each transaction object comprises an input state and an output state, the output state of a first transaction object being the input state of a second transaction object.

7. The method of claim 1, wherein the notary service executes a consensus protocol to achieve consistency between transaction objects across the first node and the second node.

8. The method of claim 1, wherein the digital records platform comprises a permissioned distributed ledger system.

9. The method of claim 1, wherein the digital record is stored in a blockchain.

10. The method of claim 1, wherein the digital record is provided from a library of digital records maintained within the digital record platform.

11. The method of claim 1, wherein each of the first node and the second node are operated by respective enterprises that interact with the digital records platform.

12. The method of claim 1, wherein the digital record represents a contract.

13. One or more non-transitory computer-readable storage media coupled to one or more processors and having instructions stored thereon which, when executed by the one or more processors, cause the one or more processors to perform operations comprising:

providing a first transaction hash code comprising a digital representation of a digital record between a first peer and a second peer within a digital records platform,
- the digital records platform provided by the first peer as a host peer, and
- the first transaction hash code being generated based on a hash tree, and hash codes that are generated based on one or more documents underlying the digital record, hash code of the one or more documents at least partially represented as nodes on the hash tree and the first transaction hash code being a root hash of the hash tree;

receiving one or more edits to at least one document from the second peer;

in response to the edits to at least one document from the second peer, updating the first transaction hash code to provide:
- a second transaction hash code based on the first transaction hash code and the hash tree to reflect changes in the at least one document, the hash tree comprising hash code of the at least one document with edits being as one of the nodes on the hash tree, the hash code of the at least one document with edits being updated based on the edits, and
- a transaction hash history comprising the first transaction hash code and the second transaction hash code;

receiving approval of the digital record from each of the first peer and the second peer; and executing a consensus protocol by a notary service of a third node to update transaction objects across the first node and the second node,
- the updating indicating that the transaction objects are consistent, and
- the executing a consensus protocol performed in response to the receiving the approval of the digital record.

14. The non-transitory computer-readable storage media of claim 13, wherein the first and second transaction hash codes are generated based on a plurality of hash codes comprising a documents hash code and an attachments hash code.

15. The non-transitory computer-readable storage media of claim 14, wherein the documents hash code is generated based on hash codes of respective documents underlying the digital record.

16. The non-transitory computer-readable storage media of claim 13, wherein the one or more edits comprise at least one edit to a section of a document, the second transaction hash code being generated based on the at least one edit.

17. The non-transitory computer-readable storage media of claim 13, wherein consistent transaction objects across the first peer and the second peer each comprise a digital signature of the first peer, a digital signature of the second peer, and a digital signature of the notary service.

18. The non-transitory computer-readable storage media of claim 13, wherein each transaction object comprises an input state and an output state, the output state of a first transaction object being the input state of a second transaction object.

19. The non-transitory computer-readable storage media of claim 13, wherein the notary service executes a consensus protocol to achieve consistency between transaction objects across the first node and the second node.

20. The non-transitory computer-readable storage media of claim 13, wherein the digital records platform comprises a permissioned distributed ledger system.

21. The non-transitory computer-readable storage media of claim 13, wherein the digital record is stored in a blockchain.

22. The non-transitory computer-readable storage media of claim 13, wherein the digital record is provided from a library of digital records maintained within the digital record platform.

23. The non-transitory computer-readable storage media of claim 13, wherein each of the first node and the second node are operated by respective enterprises that interact with the digital records platform.

24. The non-transitory computer-readable storage media of claim 13, wherein the digital record represents a contract.

25. A system, comprising:
one or more processors; and
a computer-readable storage device coupled to the one or more processors and having instructions stored thereon which, when executed by the one or more processors, cause the one or more processors to perform operations comprising:
  providing a first transaction hash code comprising a digital representation of a digital record between a first peer and a second peer within a digital records platform,
    the digital records platform provided by the first peer as a host peer, and
    the first transaction hash code being generated based on a hash tree, and hash codes that are generated based on one or more documents underlying the digital record, hash code of the one or more documents at least partially represented as nodes on the hash tree and the first transaction hash code being a root hash of the hash tree;
  receiving one or more edits to at least one document from the second peer;
  in response to the edits to at least one document from the second peer, updating the first transaction hash code to provide:
    a second transaction hash code based on the first transaction hash code and the hash tree to reflect changes in the at least one document, the hash tree comprising hash code of the at least one document with edits being as one of the nodes on the hash tree, the hash code of the at least one document with edits being updated based on the edits, and
    a transaction hash history comprising the first transaction hash code and the second transaction hash code;
  receiving approval of the digital record from each of the first peer and the second peer; and
  executing a consensus protocol by a notary service of a third node to update transaction objects across the first node and the second node,
    the updating indicating that the transaction objects are consistent, and
    the executing a consensus protocol performed in response to the receiving the approval of the digital record.

26. The system of claim 25, wherein the first and second transaction hash codes are generated based on a plurality of hash codes comprising a documents hash code and an attachments hash code.

27. The system of claim 26, wherein the documents hash code is generated based on hash codes of respective documents underlying the digital record.

28. The system of claim 25, wherein the one or more edits comprise at least one edit to a section of a document, the second transaction hash code being generated based on the at least one edit.

29. The system of claim 25, wherein consistent transaction objects across the first peer and the second peer each comprise a digital signature of the first peer, a digital signature of the second peer, and a digital signature of the notary service.

30. The system of claim 25, wherein each transaction object comprises an input state and an output state, the output state of a first transaction object being the input state of a second transaction object.

31. The system of claim 25, wherein the notary service executes a consensus protocol to achieve consistency between transaction objects across the first node and the second node.

32. The system of claim 25, wherein the digital records platform comprises a permissioned distributed ledger system.

33. The system of claim 25, wherein the digital record is stored in a blockchain.

34. The system of claim 25, wherein the digital record is provided from a library of digital records maintained within the digital record platform.

35. The system of claim 25, wherein each of the first node and the second node are operated by respective enterprises that interact with the digital records platform.

36. The system of claim 25, wherein the digital record represents a contract.

\* \* \* \* \*